(12) United States Patent
Abbosh et al.

(10) Patent No.: US 7,562,032 B2
(45) Date of Patent: Jul. 14, 2009

(54) ORDERING ITEMS OF PLAYABLE CONTENT OR OTHER WORKS

(75) Inventors: Oday Abbosh, The Hague (NL); Gavin Mann, The Hague (NL)

(73) Assignee: Accenture Properties (2) BV, The Hague (NL)

( * ) Notice: Subject to any disclaimer, the term of this patent is extended or adjusted under 35 U.S.C. 154(b) by 887 days.

(21) Appl. No.: 10/204,569

(22) PCT Filed: Feb. 21, 2001

(86) PCT No.: PCT/GB01/00719

§ 371 (c)(1), (2), (4) Date: Feb. 13, 2003

(87) PCT Pub. No.: WO01/62065

PCT Pub. Date: Aug. 30, 2001

(65) Prior Publication Data

US 2003/0149628 A1    Aug. 7, 2003

(30) Foreign Application Priority Data

Feb. 21, 2000 (GB) .................................. 0004066.7
May 22, 2000 (GB) .................................. 0012393.5
Nov. 1, 2000 (GB) .................................. 0026701.3

(51) Int. Cl.
  *G06Q 30/00* (2006.01)
(52) U.S. Cl. .............................. 705/26; 705/27; 705/20; 709/227; 455/453
(58) Field of Classification Search ...................... 705/26
  See application file for complete search history.

(56) References Cited

U.S. PATENT DOCUMENTS

| | | | |
|---|---|---|---|
| 5,237,157 A | 8/1993 | Kaplan | |
| 5,504,675 A | 4/1996 | Cragun et al. | |
| 5,602,902 A | 2/1997 | Satterlund et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,640,002 A | 6/1997 | Ruppert et al. | |
| 5,665,951 A | 9/1997 | Newman et al. | |
| 5,682,525 A | 10/1997 | Bouve et al. | |
| 5,692,342 A | 12/1997 | Devlin, Jr. | |
| 5,704,791 A | 1/1998 | Gillio | |
| 5,710,887 A | 1/1998 | Chelliah et al. | |
| 5,715,403 A | 2/1998 | Stefik | |
| 5,732,398 A | 3/1998 | Tagawa | |
| 5,734,720 A | 3/1998 | Salganicoff | |
| 5,737,729 A | 4/1998 | Denman | |
| 5,755,577 A | 5/1998 | Gillio | |
| 5,758,257 A | 5/1998 | Herz et al. | |
| 5,761,071 A | 6/1998 | Bernstein et al. | |

(Continued)

OTHER PUBLICATIONS

Billboard and Creative Multimedia release music resource and buyer's guide on CD-ROM by Business Wire Oct. 10, 1996.*

*Primary Examiner*—F. Zeender
*Assistant Examiner*—Luna Champagne
(74) *Attorney, Agent, or Firm*—Fish & Richardson P.C.

(57) ABSTRACT

Self-service terminals for sampling items of playable content. The terminal includes input means for inputting selection information, and reproduction means for replaying parts of selected items. The terminal may also include means for ordering and payment information, and may be located in high density retail sites.

24 Claims, 36 Drawing Sheets

U.S. PATENT DOCUMENTS

| | | | | |
|---|---|---|---|---|
| 5,761,306 | A | 6/1998 | Lewis | |
| 5,761,683 | A | 6/1998 | Logan et al. | |
| 5,774,652 | A | 6/1998 | Smith | |
| 5,774,874 | A | 6/1998 | Veeneman et al. | |
| 5,781,723 | A | 7/1998 | Yee et al. | |
| 5,781,909 | A | 7/1998 | Logan et al. | |
| 5,784,564 | A | 7/1998 | Camaisa et al. | |
| 5,789,732 | A | 8/1998 | McMahon et al. | |
| 5,790,121 | A | 8/1998 | Sklar et al. | |
| 5,790,423 | A | 8/1998 | Lau et al. | |
| 5,791,908 | A | 8/1998 | Gillio | |
| 5,791,991 | A | 8/1998 | Small | |
| 5,795,228 | A | 8/1998 | Trumbull et al. | |
| 5,800,177 | A | 9/1998 | Gillio | |
| 5,800,178 | A | 9/1998 | Gillio | |
| 5,802,299 | A | 9/1998 | Logan et al. | |
| 5,806,071 | A | 9/1998 | Balderrama et al. | |
| 5,812,643 | A | 9/1998 | Schelberg, Jr. et al. | |
| 5,812,765 | A | 9/1998 | Curtis | |
| 5,813,863 | A | 9/1998 | Sloane et al. | |
| 5,818,446 | A | 10/1998 | Bertram et al. | |
| 5,822,436 | A | 10/1998 | Rhoads | |
| 5,822,744 | A | 10/1998 | Kesel | |
| 5,826,267 | A | 10/1998 | McMillan | |
| 5,832,119 | A | 11/1998 | Rhoads | |
| 5,845,263 | A | 12/1998 | Camaisa et al. | |
| 5,860,068 | A | 1/1999 | Cook | |
| 5,864,676 | A | 1/1999 | Beer et al. | |
| 5,867,562 | A | 2/1999 | Scherer | |
| 5,872,844 | A | 2/1999 | Yacobi | |
| 5,872,850 | A | 2/1999 | Klein et al. | |
| 5,880,740 | A | 3/1999 | Halliday et al. | |
| 5,882,206 | A | 3/1999 | Gillio | |
| 5,883,628 | A | 3/1999 | Mullaly et al. | |
| 5,897,622 | A | 4/1999 | Blinn et al. | |
| 5,897,623 | A | 4/1999 | Fein et al. | |
| 5,898,594 | A | 4/1999 | Leason et al. | |
| 5,899,982 | A | 5/1999 | Randle | |
| 5,900,608 | A | 5/1999 | Iida | |
| 5,901,287 | A | 5/1999 | Bull et al. | |
| 5,903,271 | A | 5/1999 | Bardon et al. | |
| 5,905,246 | A | 5/1999 | Fajkowski | |
| 5,905,248 | A | 5/1999 | Russell et al. | |
| 5,905,865 | A | 5/1999 | Palmer et al. | |
| 5,905,940 | A | 5/1999 | Arvisais | |
| 5,915,243 | A | 6/1999 | Smolen | |
| 5,915,973 | A | 6/1999 | Hoehn-Saric et al. | |
| 5,918,213 | A | * | 6/1999 | Bernard et al. ............... 705/26 |
| 5,918,214 | A | 6/1999 | Perkowski | |
| 5,920,882 | A | 7/1999 | Bennett et al. | |
| 5,923,324 | A | 7/1999 | Berry et al. | |
| 5,926,624 | A | 7/1999 | Katz et al. | |
| 5,930,810 | A | 7/1999 | Farros et al. | |
| 5,932,865 | A | 8/1999 | Drexler | |
| 5,933,811 | A | 8/1999 | Angles et al. | |
| 5,933,816 | A | 8/1999 | Zeanah et al. | |
| 5,936,542 | A | 8/1999 | Kleinrock et al. | |
| 5,937,160 | A | 8/1999 | Davis et al. | |
| 5,937,163 | A | 8/1999 | Lee et al. | |
| 5,946,660 | A | 8/1999 | McCarty et al. | |
| 5,948,040 | A | 9/1999 | DeLorme et al. | |
| 5,949,411 | A | 9/1999 | Doerr et al. | |
| 5,949,679 | A | 9/1999 | Born et al. | |
| 5,950,173 | A | 9/1999 | Perkowski | |
| 5,951,620 | A | 9/1999 | Ahrens et al. | |
| 5,953,725 | A | 9/1999 | Eprahim et al. | |
| 5,954,640 | A | 9/1999 | Szabo | |
| 5,959,944 | A | 9/1999 | Dockes et al. | |
| 5,963,916 | A | * | 10/1999 | Kaplan ........................ 705/26 |
| 5,968,117 | A | 10/1999 | Schuetze | |
| 5,970,474 | A | 10/1999 | LeRoy et al. | |
| 5,974,004 | A | 10/1999 | Dockes et al. | |
| 5,974,146 | A | 10/1999 | Randle et al. | |
| 5,974,418 | A | 10/1999 | Blinn et al. | |
| 5,979,757 | A | 11/1999 | Tracy et al. | |
| 5,983,200 | A | 11/1999 | Slotznick | |
| 5,983,230 | A | 11/1999 | Gilbert et al. | |
| 5,992,752 | A | 11/1999 | Wilz, Sr. et al. | |
| 5,995,921 | A | 11/1999 | Richards et al. | |
| 5,995,943 | A | 11/1999 | Bull et al. | |
| 5,999,598 | A | * | 12/1999 | Henrick et al. ........... 379/93.07 |
| 5,999,914 | A | 12/1999 | Blinn et al. | |
| 6,002,518 | A | 12/1999 | Faris | |
| 6,008,807 | A | 12/1999 | Bretschneider et al. | |
| 6,009,429 | A | 12/1999 | Greer et al. | |
| 6,011,758 | A | 1/2000 | Dockes et al. | |
| 6,012,087 | A | 1/2000 | Freivald et al. | |
| 6,016,476 | A | 1/2000 | Maes et al. | |
| 6,018,695 | A | 1/2000 | Ahrens et al. | |
| 6,020,883 | A | 2/2000 | Herz et al. | |
| 6,021,428 | A | 2/2000 | Miloslavsky | |
| 6,024,641 | A | 2/2000 | Sarno | |
| 6,025,843 | A | 2/2000 | Sklar | |
| 6,026,382 | A | 2/2000 | Kalthoff | |
| 6,026,387 | A | 2/2000 | Kesel | |
| 6,029,195 | A | 2/2000 | Herz | |
| 6,032,130 | A | 2/2000 | Alloul et al. | |
| 6,032,177 | A | 2/2000 | O'Donnell | |
| 6,035,280 | A | 3/2000 | Christensen | |
| 6,037,934 | A | 3/2000 | Himmel et al. | |
| 6,038,545 | A | 3/2000 | Mandeberg et al. | |
| 6,038,551 | A | 3/2000 | Barlow et al. | |
| 6,041,311 | A | 3/2000 | Chislenko et al. | |
| 6,041,360 | A | 3/2000 | Himmel et al. | |
| 6,043,827 | A | 3/2000 | Christian et al. | |
| 6,044,362 | A | 3/2000 | Neely | |
| 6,044,382 | A | 3/2000 | Martino | |
| 6,048,271 | A | 4/2000 | Barcelou | |
| 6,049,777 | A | 4/2000 | Sheena et al. | |
| 6,049,778 | A | 4/2000 | Walker et al. | |
| 6,052,132 | A | 4/2000 | Christian et al. | |
| 6,055,573 | A | 4/2000 | Gardenswartz et al. | |
| 6,195,646 | B1 | * | 2/2001 | Grosh et al. ................. 705/26 |
| 6,317,792 | B1 | * | 11/2001 | Mundy et al. .............. 709/227 |
| 6,553,350 | B2 | * | 4/2003 | Carter ........................ 705/20 |

* cited by examiner

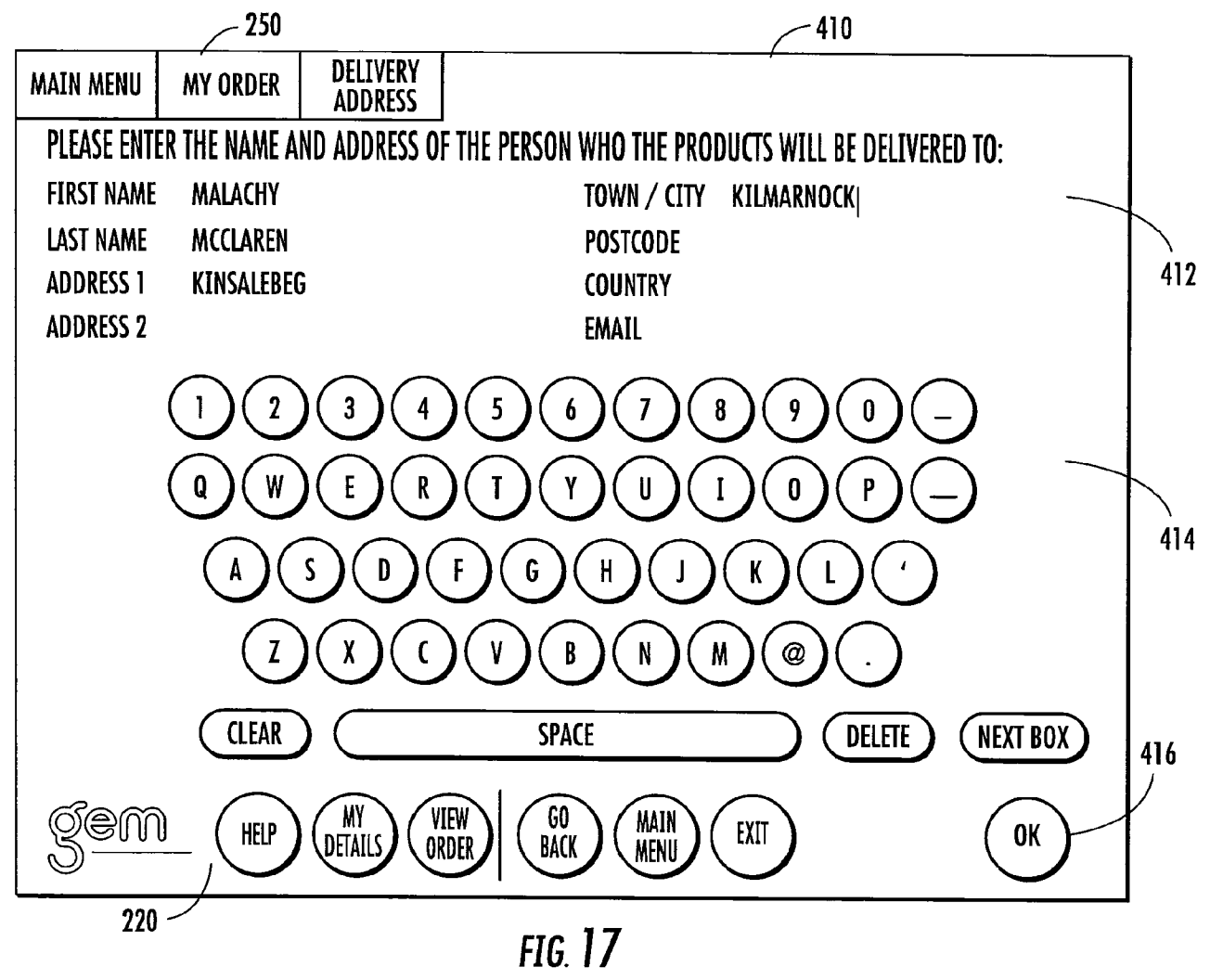

| MAIN MENU | MY ORDER | DELIVERY ADDRESS |
|---|---|---|

PLEASE ENTER THE NAME AND ADDRESS OF THE PERSON WHO THE PRODUCTS WILL BE DELIVERED TO:

FIRST NAME   MALACHY                TOWN / CITY   KILMARNOCK|
LAST NAME    MCCLAREN               POSTCODE
ADDRESS 1    KINSALEBEG             COUNTRY
ADDRESS 2                           EMAIL

FIG. 17

ORDERING ITEMS OF PLAYABLE CONTENT OR OTHER WORKS

FIELD OF THE INVENTION

This invention relates to apparatus and methods for electronically ordering items of playable content such as musical works, videos or films, computer games and simulations, or other audiovisual works.

BACKGROUND TO THE INVENTION

Conventionally, such works are purchased as boxed media (e.g. a tape, a Compact Disc (CD) or a Digital Versatile Disc (DVD) carrying the work recorded on them, over the counter of a shop, or by post from a catalogue supplier. Much music is sold through specialist music shops, with knowledgeable counter staff to assist in selection and purchase, although large supermarkets or department stores may carry a limited range of more popular works. Historically, much the same pattern has developed for videos and computer games, which are stocked by specialist music shops and by smaller numbers of specialist game and/or video shops, as well as (in limited range) in large supermarkets or department stores.

Specialist music shops sometimes have listening booths, operating somewhat like a jukebox, where a prospective customer can select and hear part of a work to determine whether or not to purchase it. For other advice, such as on availability of new works by particular artists, or on suitable works for purchase for a gift, the advice of the specialist shop staff is sought. Non-specialist shops, of course, lack either of these facilities.

Recently, Internet "shops" such as Amazon (URL www.amazon.com) and Books Online (URL www.bol.com) have made a business of selling books and, more recently, musical works via the Internet, charging by credit card. In some cases, the prospective purchaser can download and play a clip of the work to be purchased. However, at present, this channel is available only to the technically literate, in possession of a multimedia personal computer and appropriate software. Concerns are also expressed about the security of credit card transactions over the Internet, where data may be intercepted by fraudsters. Whatever the real level of risk involved, the threat of fraud can at present deter customers.

European patent application EP 0649 121 desribes a booth or kiosk type system located at retail premises and connected to a number of content servers for downloading content in real-time. The content servers are arranged hierarchically so that distributed local servers predominantly store currently popular content and central servers store a more complete content list. Thus, network load is reduced while still making available a comprehensive catalogue of items. The kiosks/booths are connected to customer accounting and sale systems, but not to any in-store stock system. Items for purchase are locally recorded onto physical media (eg. burnt onto a CD) rather than being ordered or bought from in-store stock.

U.S. Pat. No. 5,237,157 describes a kiosk-based system placed in a retail outlet for providing a potential buyer with "preview" music samples from CDs. The music samples are stored in a compressed format on a number of CD ROM discs in a multi-disc loader system. The user obtains a subscription card (by filling out an application form) and selects a CD box from the store display. The kiosk scans the user's subscription card and the CD and identifies the user and CD. A graphical user interface of the kiosk presents a relevant photograph for the CD and a series of touchscreen buttons for various songs on the CD. The user selects a song for previewing by touching one of the buttons. The patent also describes a central server connected to each kiosk over a telecommunications link for collecting data concerning use of the kiosk. Data collected may be used as a marketing tool. Further, the patent also describes playing a CD sampler on the stores sound system so that a customer can become interested in a track, ask the sales assistants for details and use the kiosk to find out more.

U.S. Pat. No. 5,963,916 takes the kiosk system, located at retail premises, of the previously described patent and describes some improvements. The major development is that the kiosks are now dumb web clients and receive both the "preview" music samples (as an audio stream) and the user interface (ie. HTML pages) over a telecommunications link from a centralised Web server. Also, the customer is now able to place an order for purchasing CDs using a shopping basket concept on the kiosk. The system is also described as being suitable for home computer use.

SUMMARY OF THE INVENTION

The present applicants propose a new distribution channel for electronically ordering playable works. It consists of a plurality of preferably freestanding, self-service terminals, located in high density retail sites. Each is equipped with a reproduction system for playing the works, and input devices for inputting selection, ordering, and payment information.

By providing the terminals, rather than relying on shop staff, customers are freed from the need to seek out and shop at specialist shops. Where, as envisaged, the terminal is sited in a general shop (such as a supermarket or department store), the customer can make specialist purchases of works not stocked in the shop, without leaving the shop, to the benefit of the customer and shop owners alike.

Further, the customer can make their selections in private, and in their own time.

By providing specialised freestanding, self-service terminals, rather than allowing access through a customer's computer and the Internet, the customer can be precluded from storing or copying the works, thus reassuring the copyright holders of the works that piracy is impossible.

Preferably, the terminals are interconnected with one or more database-storing computers via a private telecommunications channel (rather than the Internet). This enables credit card and other payment data to be carried securely, allowing the customer to purchase without fear of fraud.

Preferably, the channel is broadband in the to-terminal direction. This allows the works, and associated data, to be stored centrally rather than locally at each terminal, allowing the terminals to be kept up to date without periodic large-scale updating of the data stored at the terminals, whilst enabling them to be downloaded for replay substantially without delay, to avoid what Internet users have termed the "World-Wide Wait".

Preferably, the terminals are arranged to accept input of a number of different search parameters, and to locate works corresponding to the parameters for selection by the customer. These parameters will include the name of artist or the name of the work, and preferably also some genre classification information on the work (e.g., for a musical recording, "dance", "easy listening", "country" and so on, as currently used in specialist music shops or catalogues).

Preferably, the record stored for each work in the database-storing computer also includes co-selection information, indicating other works commonly selected by previous customers who have selected the work concerned, and/or demographic information indicating the average age, sex, and other demographic parameters of previous customers who have selected the work concerned. Thus, the prospective customer can search for a suitable work (for example, as a gift) by inputting demographic data of the recipient.

Preferably, the terminals are arranged or adapted to determine, or obtain information determinative of, a characteristic of a particular work, or item of playable content, in dependence on local factors such as factors relating to the site in which a given terminal is located.

For instance, the database-storing computer preferably has a connection to the stock control computers of one or more shops (or chains of shops) in which the terminals may be located. Thus, if a customer wishes to order a particular work, the database-storing computer may determine the location of the terminal; interrogate the stock control computer of the chain of shops (if any) including that at which it is located; and, if the work is indicated to be available at that shop; transmit an indication thereof to the terminal to allow the terminal to display the fact to the customer. Thus, the customer has the option of making an immediate purchase of the work from their present location, or of ordering it for delivery.

Furthermore, the price of the particular work or item may be determined in dependence on local factors such as whether or not the particular item is available in the site within which the terminal is located, the time of day, day of week, the geographical location of the site, the identity of the particular retail site, the current usage of the network, the identity of the particular item, and the demand for the particular item.

Furthermore, the terminal is preferably arranged to determine whether a particular work or item is or has recently been playing in the site within which the terminal is located, and, if so, to indicate the fact to the customer. Thus, the customer may easily sample or order, using the terminal, an item which is currently playing or has recently been played in the general area of the retail site or shop in which the terminal is located.

Preferably, the terminals include a card reader (e.g. a magnetic stripe reader or a "smart card" reader) arranged to accept standardised credit, debit or loyalty cards. This provides an additional level of security over simply typing in the credit card number (which might have been fraudulently obtained).

Preferably, the database-storing computer includes a customer database, storing name, address, and demographic information for each customer who undergoes a registration operation at the terminal, at the first time of use of the system. On subsequent uses, the customer may simply be recognised by the insertion of their credit, or other payment card (or by typing in their name). Thus, the need for the customer to re-key details such as their home address for delivery is reduced.

Preferably, the terminals include a printer, to allow the printing of a receipt for each order, thus increasing the level of customer assurance in the transaction.

Preferably, the system is capable of varying the prices of articles, using the local date/time and/or location of the terminals.

Other aspects, embodiments and preferred features are as described in the following description, claims and drawings, with advantages which will be apparent hereafter.

BRIEF DESCRIPTION OF THE DRAWINGS

Embodiments of the invention will now be illustrated, by way of example only, with reference to the accompanying drawings, in which:

FIG. 17 is a screenshot of a delivery address entry page displayed by a terminal of the first embodiment;

DESCRIPTION OF PREFERRED EMBODIMENT

Figure 1:
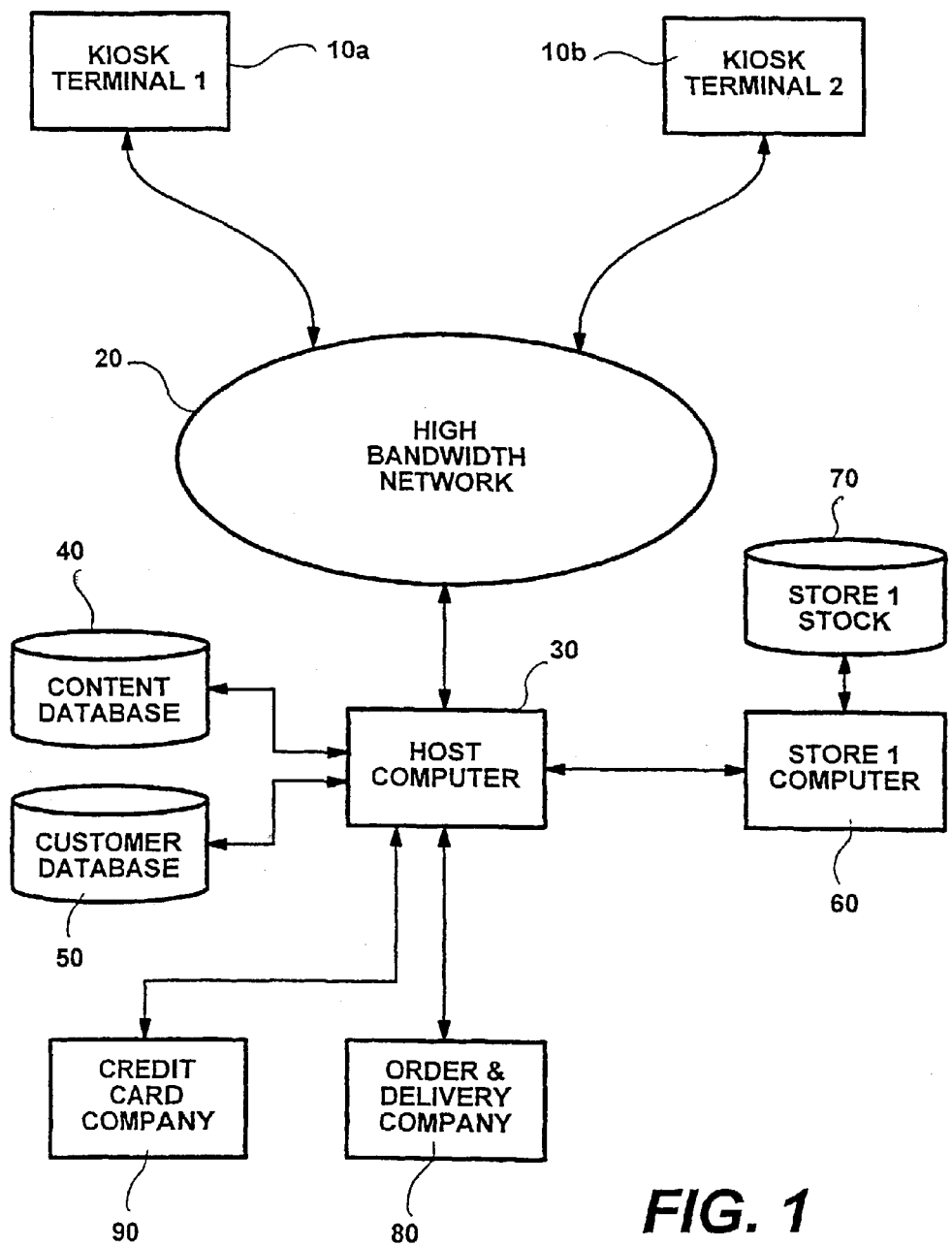
FIG. 1 is a block diagram illustrating the overall organisation of apparatus of a first embodiment of the invention.

Referring to FIG. 1, a preferred embodiment of the invention comprises a plurality of kiosk terminals 10a, 10b . . . . Each is located at a suitable site. Terminal 10a is located at a department store. Terminal 10b is located within a concourse of a shopping centre or mall. Other terminals 10 (not shown) are located at other high-density retail sites.

Each terminal 10 is connected to a high bandwidth network 20, and thence to a central host computer 30. The network comprises a private virtual network made up of high capacity leased lines to each terminal 10, capable of delivering music or video clips of up to a minute without excessive delay (i.e. in seconds or less). It may, for example, comprise a 512 Kbit/sec leased line. It also comprises a pair of signalling channels, one in the to-terminal direction and one in the from-terminal direction; these carry data input by the customer and read from the card reader of the terminals, and hence a much lower data rate is satisfactory (e.g. a few hundred bits per second or less).

The host computer 30 comprises a plurality of circuit interfaces for communicating simultaneously with a plurality of the terminals 10; and a processor (and associated memory and permanent storage) performing a program for responding to requests for data, and handling purchase orders, from the terminals 10 as will be discussed in more detail below.

It is connected to interrogate a content database 40 and a customer database 50, which each be provided on storage comprised within or co-located with the host computer 30; or alternatively may be remotely located therefrom.

It is also connected (e.g. via a leased line signalling connection) to the central stock computer 60 of the chain of stores which includes the store in which the terminal 10a is located. That computer 60 is connected to (or includes) a stock database listing the items carried and the shops in which they are carried. In general, the host computer 30 is connected to the central computers of all shop chains in which terminals 10 are located.

It is also connected to the network of a credit card company 90, and of an order and delivery company 80 (e.g. a so-called "fulfilment" agency such as Entertainment UK or E-UK, website at www.entuk.com, specialising in supply of items to order).

Figure 29:
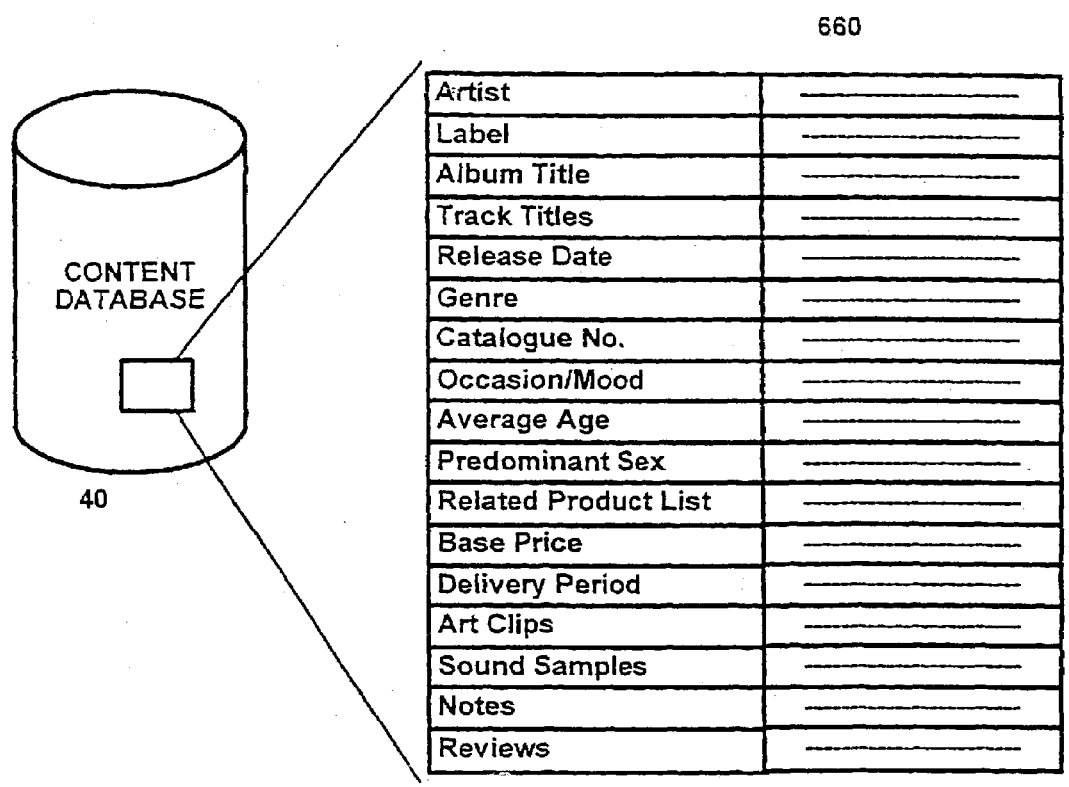
FIG. 29 is a schematic diagram showing a typical data record maintained by a host computer contents database of the first embodiment.

FIG. 29 shows content database 40 and a typical database record 660 held for a pop music album track. Database records are stored by individual track rather than album. Data record 660 contains a plurality of fields such as artist name, record label, album title from which the track is taken, track title, release date, genre, catalogue number, occasion/mood classification, average age interested in the album from which the track is taken, predominant sex interested in the album from which the track is taken, a related product list (i.e. the catalogue numbers of related products that a customer may be interested in purchasing), base price of product, delivery period of product, art clips, sound samples, written notes concerning the album from which the track is taken, and written reviews of the album from which the track is taken. This data may be obtained from music industry sources such as Muze Inc. (TM) (website at www.muze.com).

The average age interested and predominant sex interested may also be updated from records of sales of the album made using the kiosk system. Similarly the related product list may be compiled from data obtained from records of sales made using the kiosk system, such as the most common products bought by all those who have bought the album concerned.

The occasion/mood classification identifies occasions/moods for which the album is suitable, and is used, together with the average age interested and predominant sex interested fields, to provide a general search page for customers looking for a product to suit a mood or occasion or suitable as a present for a person of a certain age and sex.

Figure 2:
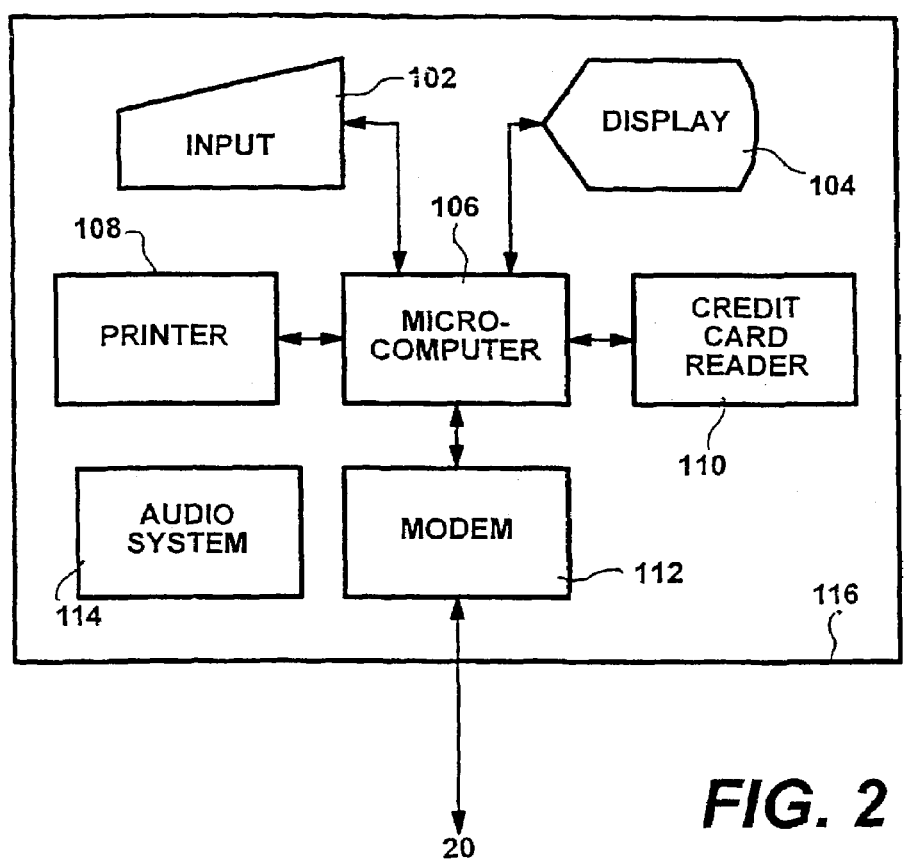
FIG. 2 is a block diagram illustrating the components of a terminal of FIG. 1.

Referring now to FIG. 2, each terminal 10 comprises an input device 102; a display screen 104; a microcomputer 106; a printer 108; a credit card reader 110; a modem 112; an audio reproduction circuit 114; all located within a housing 116 defining a free-standing unit to which access to the interior is impossible.

The microcomputer 106 comprises a commercially available device, for example incorporating an Intel Pentium (TM) microprocessor or equivalent, and peripheral chips, and associated memory. No floppy disc device or other removable storage device is provided. An internal hard disc may be provided, or the operating program (to be described) may operate from Read-Only Memory (ROM).

The credit card reader and printer are commercially available devices as used in Automatic Teller Machines (ATMs).

The audio reproduction device 114 may be a sound card (e.g. a Soundblaster (TM) compatible card) together with a stereo pair of loudspeakers, arranged to play audio data from the microcomputer 106.

The input device 102 and display screen 104 are conveniently integrated into a touchscreen device, allowing the user to interact directly with the screen and eliminating moving parts. They are positioned towards the top of the freestanding unit, at around chest height for an average person. The loudspeakers of the audio reproduction system 114 are positioned at either side of the touchscreen. The modem 112 is connected to a plug at the bottom of the terminal 10, connected to a socket in the floor of the retail environment in which it is located, carrying a line into the network 20, inaccessible to a customer. In a variant of the present embodiment, the terminal is integrated into non-freestanding shop equipment, furniture or building.

The microcomputer 106 runs an operating system (e.g. Windows 2000 (TM), Windows CE (TM) both available from Microsoft, EPOC 32 available from Symbian, or UNIX), supporting a graphical user interface (GUI) and a Java Virtual Machine (JVM). The JVM program interprets a Java program which controls the interaction between the terminal 10 and the customer.

In use, as will be described in greater detail below, the kiosk terminal 10 displays a series of screens which include displaying "button" areas, through which a user can input data or select from a list of options. In response to the input of data, further screens will be displayed, and communications with the host computer 30 will take place. The kiosk terminal 10 (and, where relevant, host computer 30) are arranged to perform at least the following processes:

1—Register a new user (and record their details in the customer database).

2—Allow a new or existing user to log on.

3—Allow the user to browse or search the database for works to be purchased.

4—Compile a list of works to be purchased (i.e. an "order basket").

5—Enter an address for shipping.

6—Pay for an order by credit card or the like.

7—Check whether the work to be purchased is available in the premises where the kiosk terminal 10 is located.

8—Propose possible purchases based on similarity to current or previous purchases.

9—Print out a receipt.

The functioning of the kiosk system of the present invention will now be described as used by a customer in a store in which a kiosk terminal, such as kiosk 10a, is located, with reference to FIGS. 3 to 26. Whilst specific mention will be made of interaction occurring between the microcomputer 106 of kiosk 10a and host computer 30, over network link 20 at various points in the following section, it is to be understood that the kiosk system is a networked system in which frequent interaction occurs between the various elements making up the system shown at FIG. 1.

The general processes involved in interaction between the customer, kiosk 10a and host computer 30 will be described below with reference to FIGS. 27 and 28.

Figure 3:
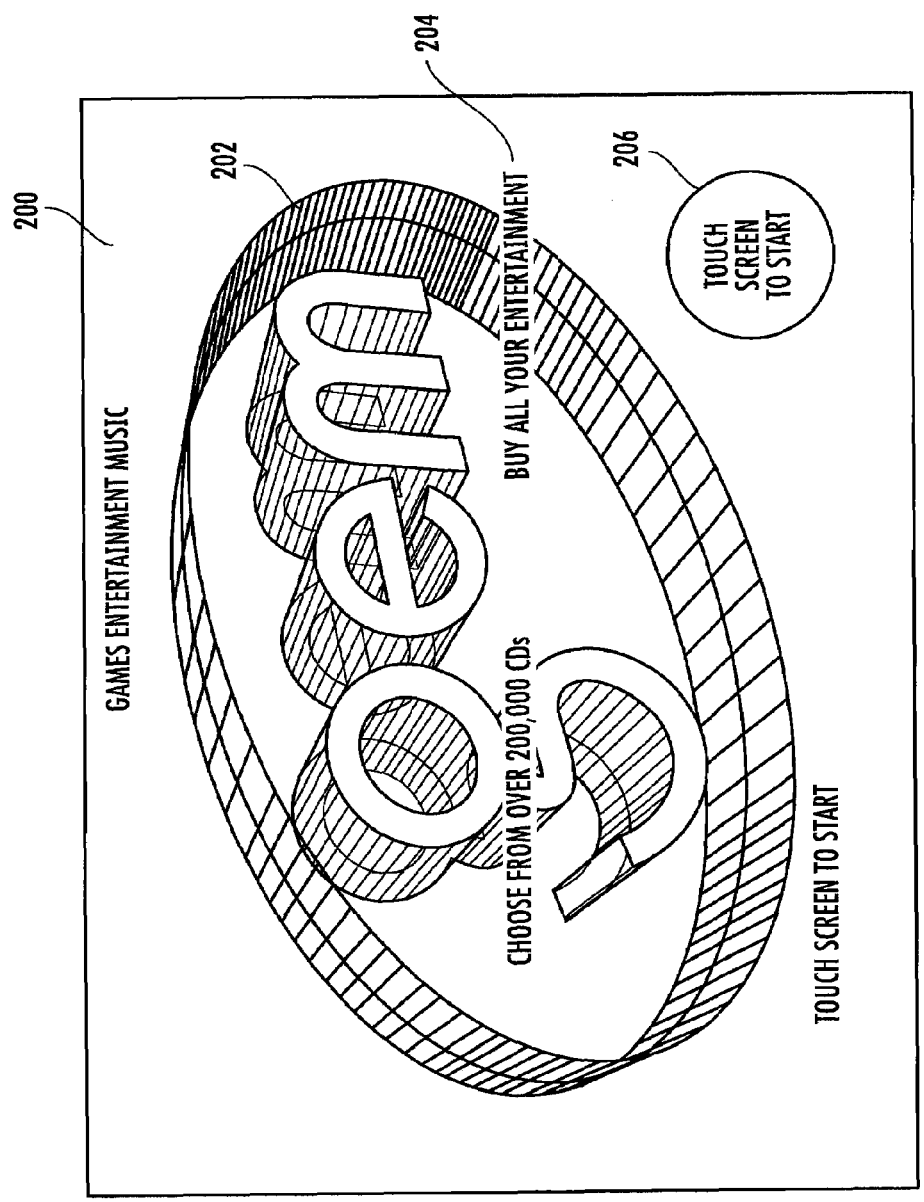
FIG. 3 is a screenshot of a default page displayed by a terminal of the first embodiment.
Figure 4:
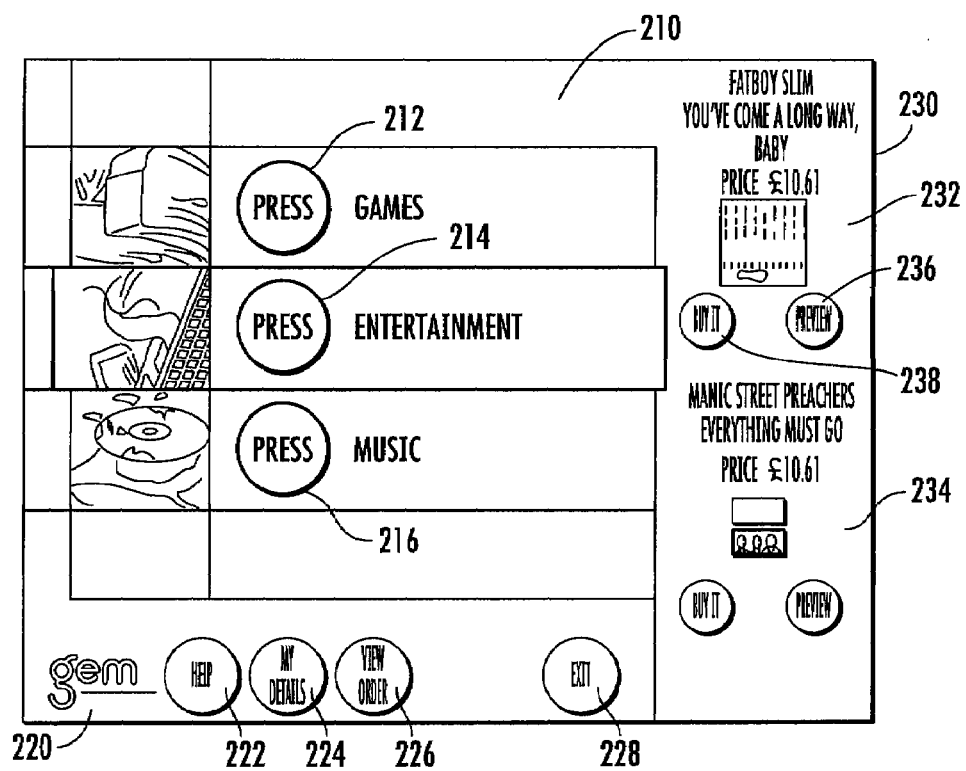
FIG. 4 is a screenshot of a main menu page displayed by a terminal of the first embodiment.

With kiosk 10a in a powered-up but unused state, microcomputer 106 displays a default page on display 104. FIG. 3. shows the default page 200 which constitutes a background image 202 with the brand name of the kiosk system and various text messages 204 including message "Touch screen to start" presented within a button 206. A customer wishing to use kiosk 10a touches touch-screen input 102 at button 206 which causes microcomputer 106 to display the main menu page of the kiosk system shown at FIG. 4.

Main menu page 210 shows a series of main options and associated buttons 212 (games), 214 (entertainment), 216 (music) corresponding to the categories of items that can be purchased using the kiosk system. Also shown is a standard menu bar 220 with four buttons 222, 224, 226 and 228 for accessing help information, entering customer details, viewing previous or existing orders and exiting to the default page respectively. This standard menu bar is generally displayed on every page, except default page 200, to assist customers to use the system more efficiently.

Also shown on main menu page 210 is a related information panel 230 which is used dynamically to display related information to the customer such as related items the customer may be interested in purchasing. Here, related information panel 230 shows basic details of two currently popular albums 232 and 234, including the titles, prices and front cover art clips. Beneath the details for album 232 are two buttons 236 and 238 for previewing and purchasing the albums respectively. If the customer presses input 102 at button 236, microcomputer 106 displays a page such as described below with reference to FIG. 9 for providing the customer with details of the album such as artist, title, record label, original release date, track listing, total length, price and delivery period as well further notes, reviews, and the option to play selected sound clips from the album via the audio reproduction 114. These data are retrieved via host computer 30 from database 40. If, however, the customer presses input 102 at button 238, microcomputer 106 displays a page such as described below with reference to FIG. 12 for purchasing the album there and then.

In general, the information displayed on the related information panel 230 may be related to any of the information currently displayed on the page, previous selections or other information input by the customer (whether in the current session with the kiosk 10a or in previous sessions with a kiosk of the same network), various aspects of the store or trade channel in which kiosk 10a is located, or other information supplied by one of the computers connected to microcomputer 106.

Typically these will be items the customer may be interested in buying whether items of the same category—e.g. another album by the same artist or a related artist—or items of different categories—e.g. a video or T-shirt featuring the same artist. Furthermore, the related information panel is not static, but is dynamically updated at regular intervals to present further products of potential interest to the customer With respect to main menu page 210 in particular, albums 232 and 234 are the albums which are or have been currently playing in the store in which kiosk 10a is located. This information is dynamically obtained by microcomputer 106 from store computer 60 via host computer 30 and network 20 (but could be obtained from the music playing device or devices serving the store, or input manually into microcomputer 106).

The functionality of the system will now be described in relation to two scenarios. In the first scenario, described with reference to FIGS. 5 to 21, a new customer performs a search for a product, registers their details and then completes a purchase using the kiosk. In the second scenario, described with reference to FIGS. 13, and 22 to 26, an existing customer logs onto the kiosk and inspects their details, previous order status and loyalty points.

Figure 5:
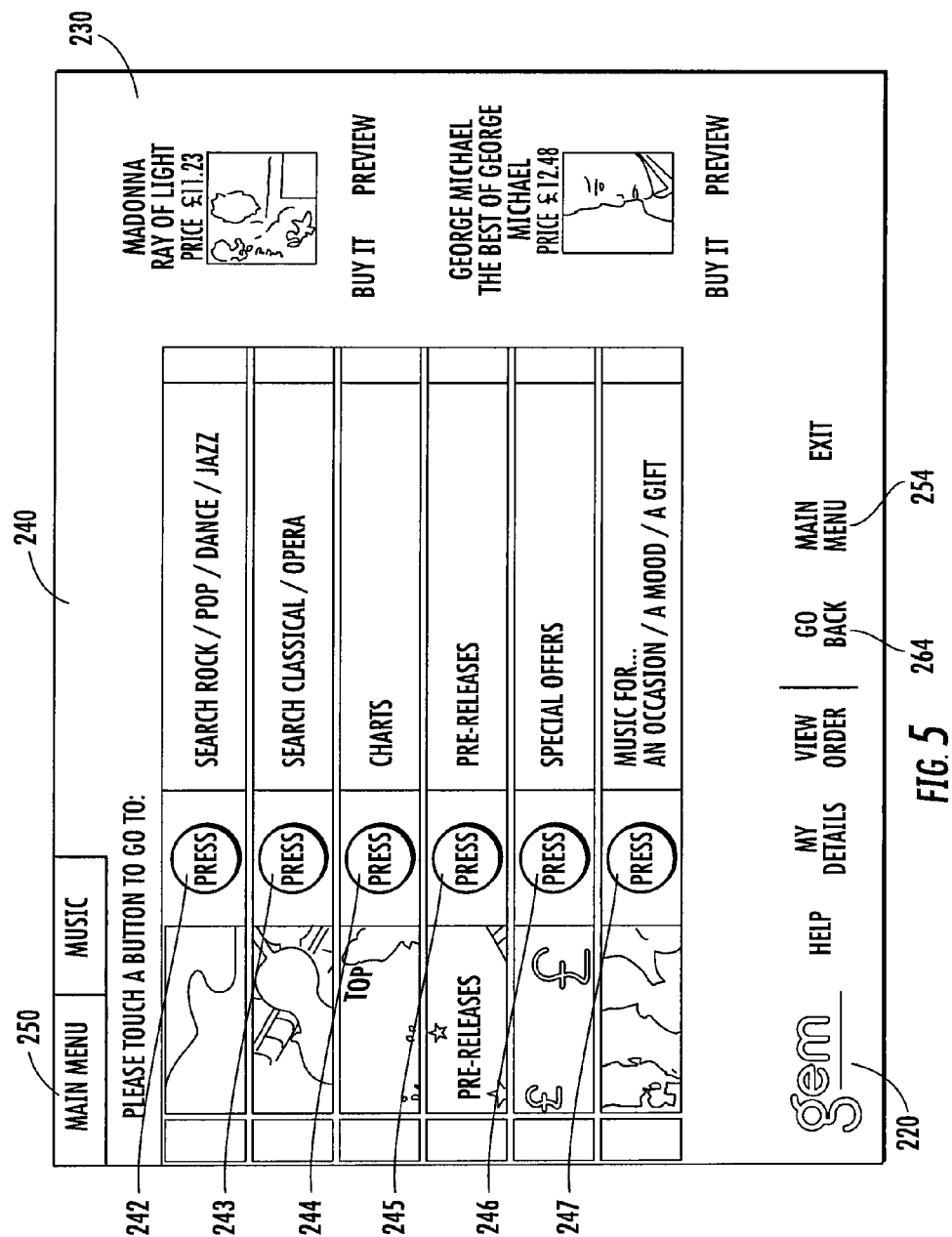
FIG. 5 is a screenshot of a main music menu page displayed by a terminal of the first embodiment.

The first scenario will be described in respect of the customer searching for and purchasing an album using the music option of main menu page 210 (although there are no material functional differences between use of the system for purchasing an album or any of the other categories of work). To select the music option, the customer presses input 102 at button 216. This causes microcomputer 106 to display the main music menu page 240 on display 104, as shown in FIG. 5.

Related information panel 230 is displayed as described above, save that different albums are presented to the customer, in this case two current best selling products. Also displayed is menu location bar 250 and standard menu bar 220. Menu location bar 250 shows the position of main music menu page 240 in relation to previous pages displayed. The menu location bar is generally displayed on every page, except default page 200 and main menu page 210, to assist customers to use the system more efficiently. It also can be used by the customer to return to previous pages displayed by pressing the appropriate part of the screen. Standard menu bar 252 provides a series of buttons as described above but with an additional button 254 for returning to the main menu and an additional button 264 for going back one page. The customer is also presented with a series of options and associated buttons 242 (search by genre—rock/pop/dance/jazz), 243 (search classical/opera), 244 (charts), 245 (pre-release information), 246 (special offers), 247 (search for music for an occasion/mood/gift) corresponding to the various ways in which the kiosk system can be used to search for music. The customer selects the option he is interested in using for searching for music and presses the appropriate button.

The search rock/pop/dance/jazz option will be described below in detail. The search classical/opera option is similar to the rock/pop/dance/jazz option, save for differing fields with which content database 40, which contains a catalogue of classified products can be searched. The charts option allows the customer to view, search or purchase products from the current overall charts and charts for particular genres of music. The pre-release option allows customers to view, search for information concerning, and preorder forthcoming releases of works.

In general, the above options are enabled by microcomputer 106 passing a database search request to host computer 30 over network link 20. Host computer 30 then performs a database search of content database 40 and passes the data records for each matching work, in response, back to microcomputer 106. The special offers option allows customers to view, search for and purchase product that are under special promotion such as price discounts. This information is obtained from pricing information held by host computer 30.

The occasion/mood/gift option allows customers to obtain advice on a product which is suitable for a particular occasions/moods, or suitable as a gift for a person of a particular age, sex and interests. Content database 40 maintains product records including fields for genre, occasion/mood suitability, average age interested in the product, and predominant sex interested in the product. The customer inputs the occasion/mood/gift information, which is used to perform a search of content database 40 using the above identified fields.

If the customer is interested in buying an album of the Beatles, he/she will press rock/pop/dance/jazz button 242. This causes microcomputer to display a search page specific to rock/pop/dance/jaz music.

Figure 6:
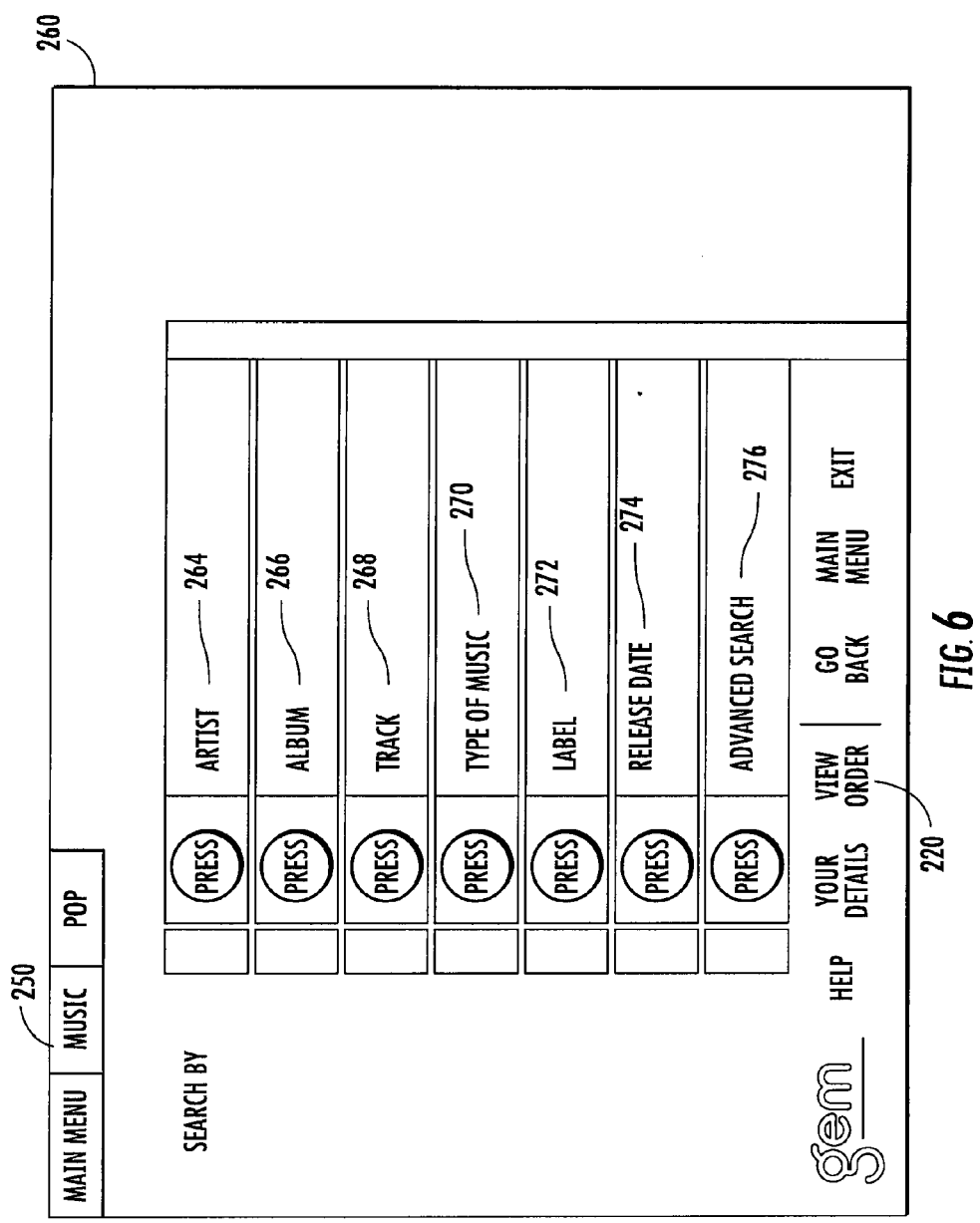
FIG. 6 is a screenshot of a rock/pop/dance/jazz search page displayed by a terminal of the first embodiment.

FIG. 6 shows rock/pop/dance/jazz search page 260 displayed on display 104. Menu location bar 250 shows the position of rock/pop/dance/jazz search page 260 in relation to previous pages displayed. Standard menu bar 220 provides a series of buttons as described above. Also shown are a series of search options and associated buttons 264 (search by artist name), 266 (search by album name), 268 (search by track name), 270 (search by type of music), 272 (search by record label name), 274 (search by album release date), and 276 (advanced search). The various search options correspond to some of the fields by which individual data records of content database 30 are classified as described below with reference to FIG. 29. Advanced search refers to a search combining various basic search options together. The customer selects search by artist by pressing button 264 and the appropriate search page is displayed.

Figure 7:
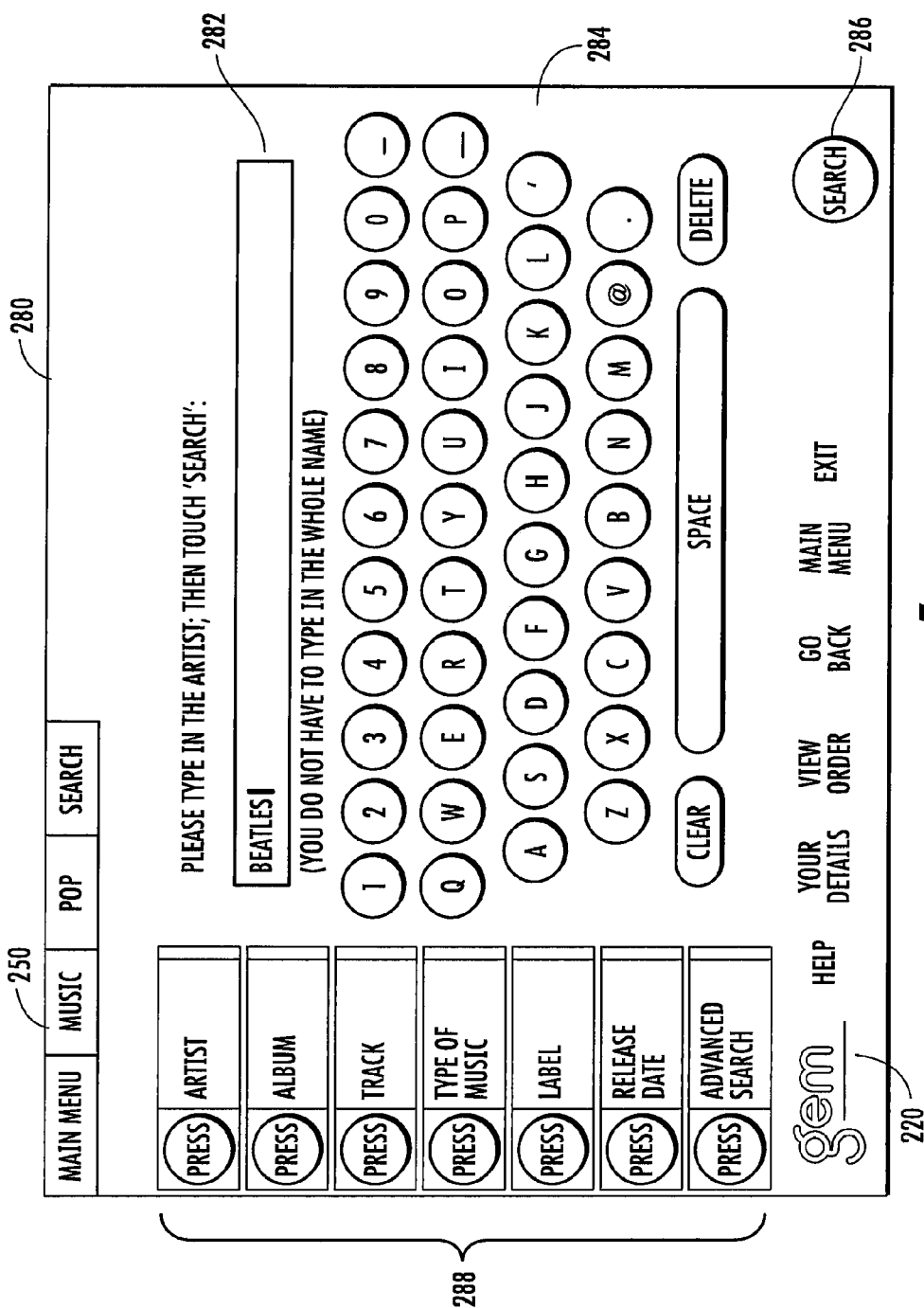
FIG. 7 is a screenshot of a search by artist page displayed by a terminal of the first embodiment.

FIG. 7 shows search by artist page 280 displayed on display 104 comprising menu location bar 250, standard menu bar 220, a text input line 282, a keyboard 284 (consisting of individual buttons for the individual keys of a "qwerty" keyboard), a search button 286 for starting the searching process, and change search type bar 288 (consisting of the various pop search options described above and corresponding buttons) for selecting a different search type. Using the buttons of keyboard 284, the customer enters the search string "BEATLES" on to touch-screen input 102 and presses button 286 to start the search.

In response, microcomputer 106 of kiosk 10a sends a request for a database search of content database 40 over the network link 20 to host computer 30. Host computer 30 performs the database search and transmits the results to microcomputer 106 over the network link 20. The data transmitted includes, for each database record, record label, album title, release date, and delivery period.

The base price field of each database record is used by host computer 30 to compute a product price in accordance with a pricing model maintained by host computer 30 and these product prices are transmitted to microcomputer 106. The pricing model may depend on the time of day, day of week, geographical location of the kiosk/store, the particular store or retail chain, the current usage of network 20, and/or other variables. For example, it may provide discounts on certain products as part of a promotion, or add a premium to certain products during periods of peak demand. Discounts based on time of day, or day of week may also be used, to entice customers into the store within which the kiosk terminal is located, at off-peak times. Also, price variations based on network usage may help level loading of the network and other elements of the system.

Figure 30:
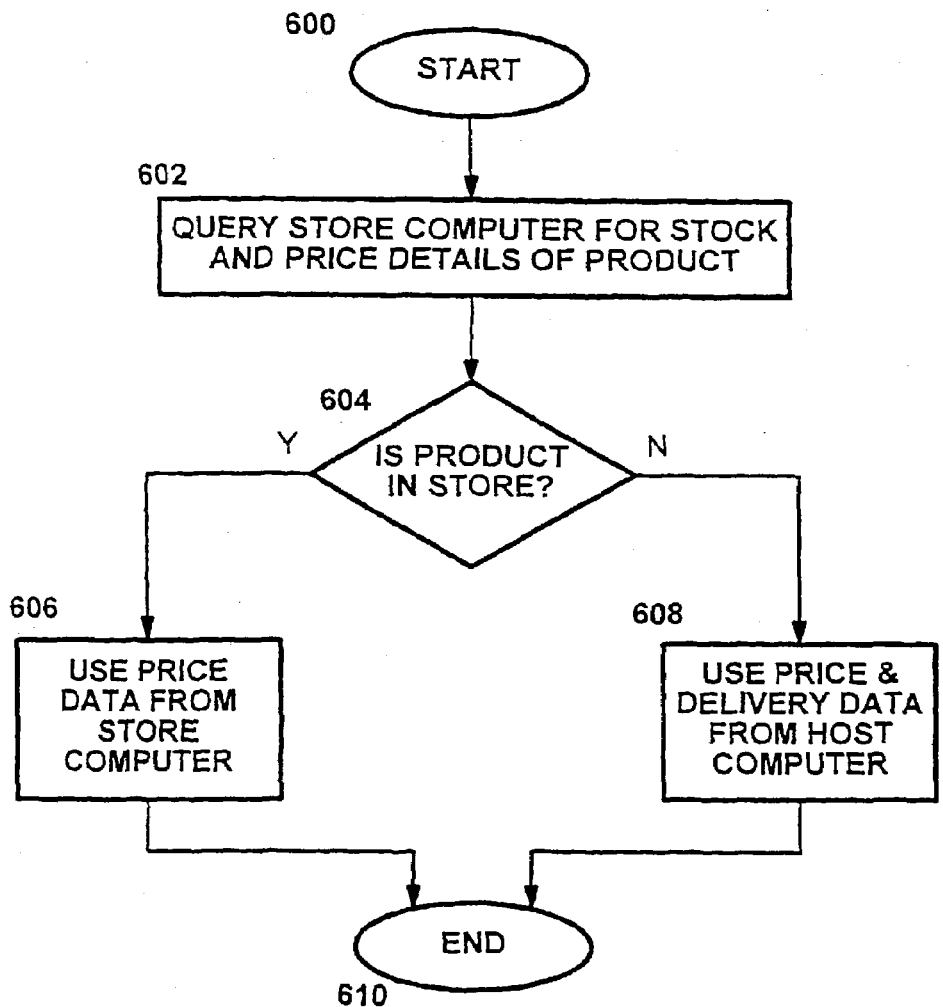
FIG. 30 is a flow diagram showing the response queuing process followed by a terminal of the first embodiment.

Additionally, microcomputer 106 requests host computer 30 to query store computer 60 as to whether each product listed in the search result is available in the store in which kiosk 10a is located and, if so, to obtain the store price from stock database 70 via store computer 60. FIG. 30 shows the process followed in determining whether to use, for each product listed, the price maintained by the kiosk system or the in store price. The process starts at step 600 and, at step 602, store computer is queried by host computer 30 for the stock and price details of the product. At step 604, host computer 30 determines whether the product is available in the store in which the kiosk is located. If it is the process continues to step 606 at which the price data obtained from the store computer is used for later transmission to microcomputer 106. If not, the process continues to step 608 at which the price computed by host computer 30 in accordance with the pricing model is used for later transmission to microcomputer 106 together with the delivery data.

Figure 8:
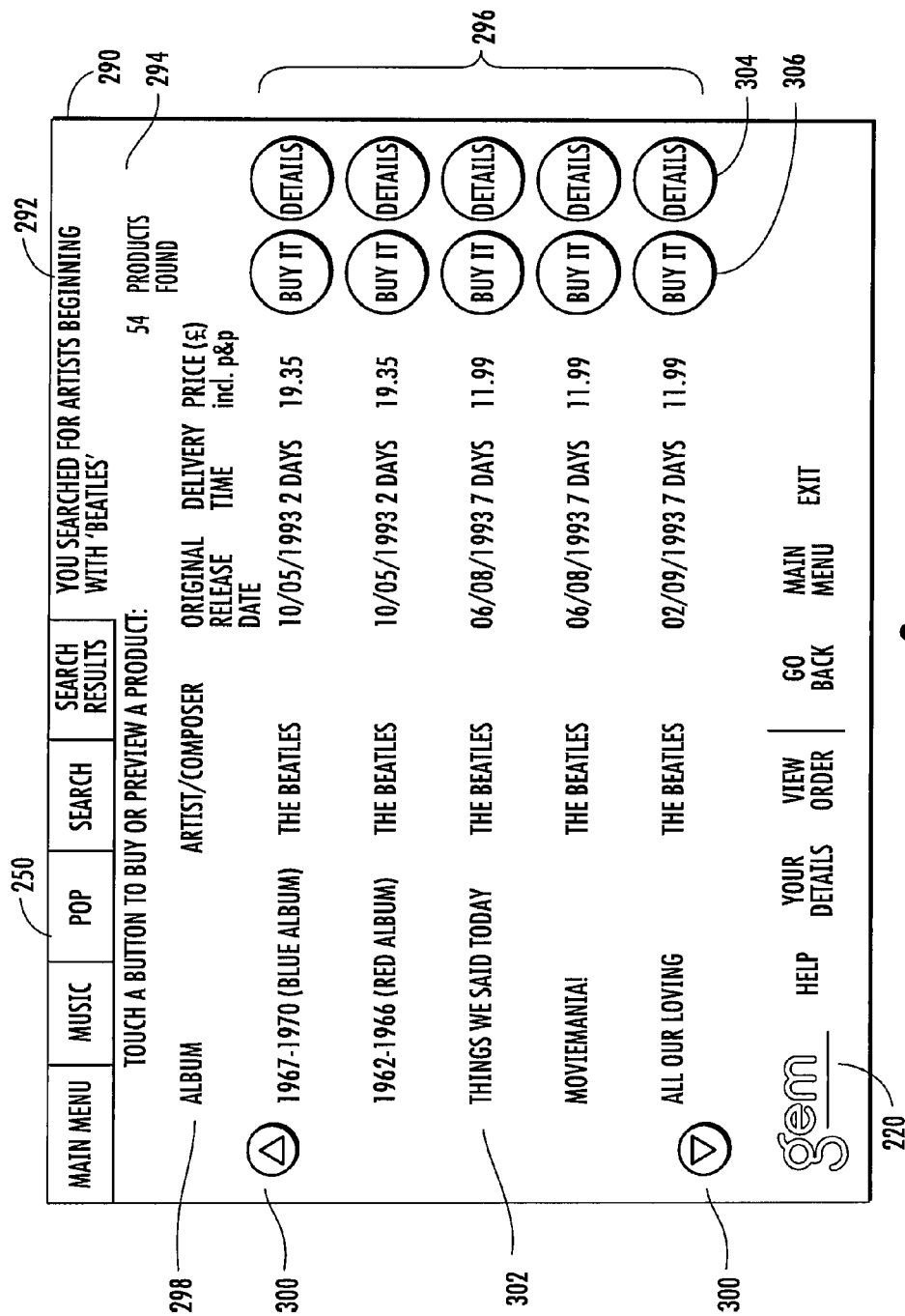
FIG. 8 is a screenshot of a search results page displayed by a terminal of the first embodiment.

Once this process is completed, microcomputer 106 displays the search results to the customer on a search results page as shown at FIG. 8. Search results page 290 comprises menu location bar 250, standard menu bar 220, a description of the search performed 292, the number of products found 294, and a breakdown of those products 296. Product breakdown 296 is presented in a tabular format with a horizontal column title bar 298 and a pair of vertical scroll buttons 300 for moving the product selected (shown as a highlighted line) up and down. Descriptions of individual products 302 are listed line by line and include details of album name, artist name, original release date, delivery period and price. The price and delivery period are determined as described above.

If the product is available in the store, the delivery period section contains the message "IN STORE" to inform the customer. Alongside each item of product list 302 are a pair of buttons 304 and 306 for, respectively, obtaining further details of or buying the product listed.

In an alternate embodiment of the present invention, where a product is available in the store and via the kiosk, the customer is presented with details of both options—i.e. price and delivery details for via kiosk purchase, and price details for in store purchase. The kiosk, however, does not allow the customer to purchase an in store product using the kiosk. Rather, the customer must pay using the store's usual payment facilities.

Figure 9:
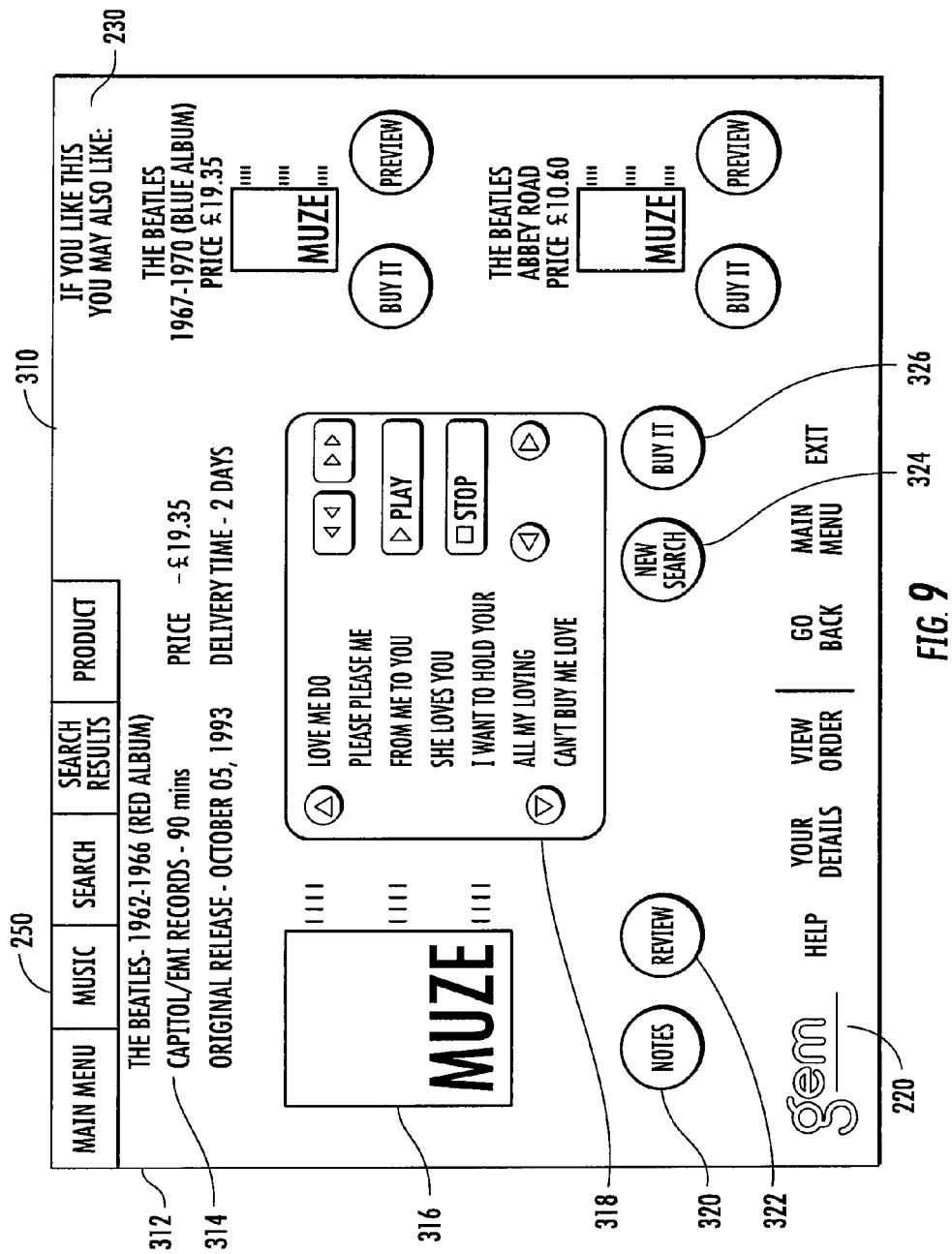
FIG. 9 is a screenshot of a first product details page displayed by a terminal of the first embodiment.

The customer, wishing to see details of the Beatles Red Album, presses input 102 at button 304. This causes microcomputer 106 to request further data from content database 40 via host computer 30, such as art clips, track information, sound samples, notes, reviews and related product information, and to display on display 104 a product detail page as shown at FIG. 9. If, however, the customer had pressed button 306, he/she would have been shown the shopping basket page shown at FIG. 12 and described in detail below.

FIG. 9 shows product detail page 310 which comprises menu location bar 250, standard menu bar 220, related information panel 230 and a detailed section on the product selected 312. The related information panel 230 shows basic details of two other albums by the Beatles which may interest the customer, together with buttons for purchasing and previewing those albums as described above with reference to FIG. 4. These albums are selected in dependence on the related product list field of the record corresponding to the Beatles Red Album held in content database 40—see below and FIG. 29 for further explanation. Detail section 312 comprises the description information 314 as displayed in search result page 290, art clip 316 taken from the album, track window 318, plus four buttons 320, 322, 324 and 326 for seeing notes, review, starting a new search and purchasing the album, respectively.

Track window 318 shows the tracks included on the album line by line together with a pair of scroll buttons for moving the track selected (shown as a highlighted line) up and down, a set of control buttons (play, stop, rewind, fast forward) for playing samples of the track selected, volume control buttons and a volume indicator. By selecting a track and pressing play, the customer causes microcomputer 106 to download from the host computer 30, and play, a sample of the track through the audio reproduction system 114. The other playing controls also function conventionally.

Figure 10:
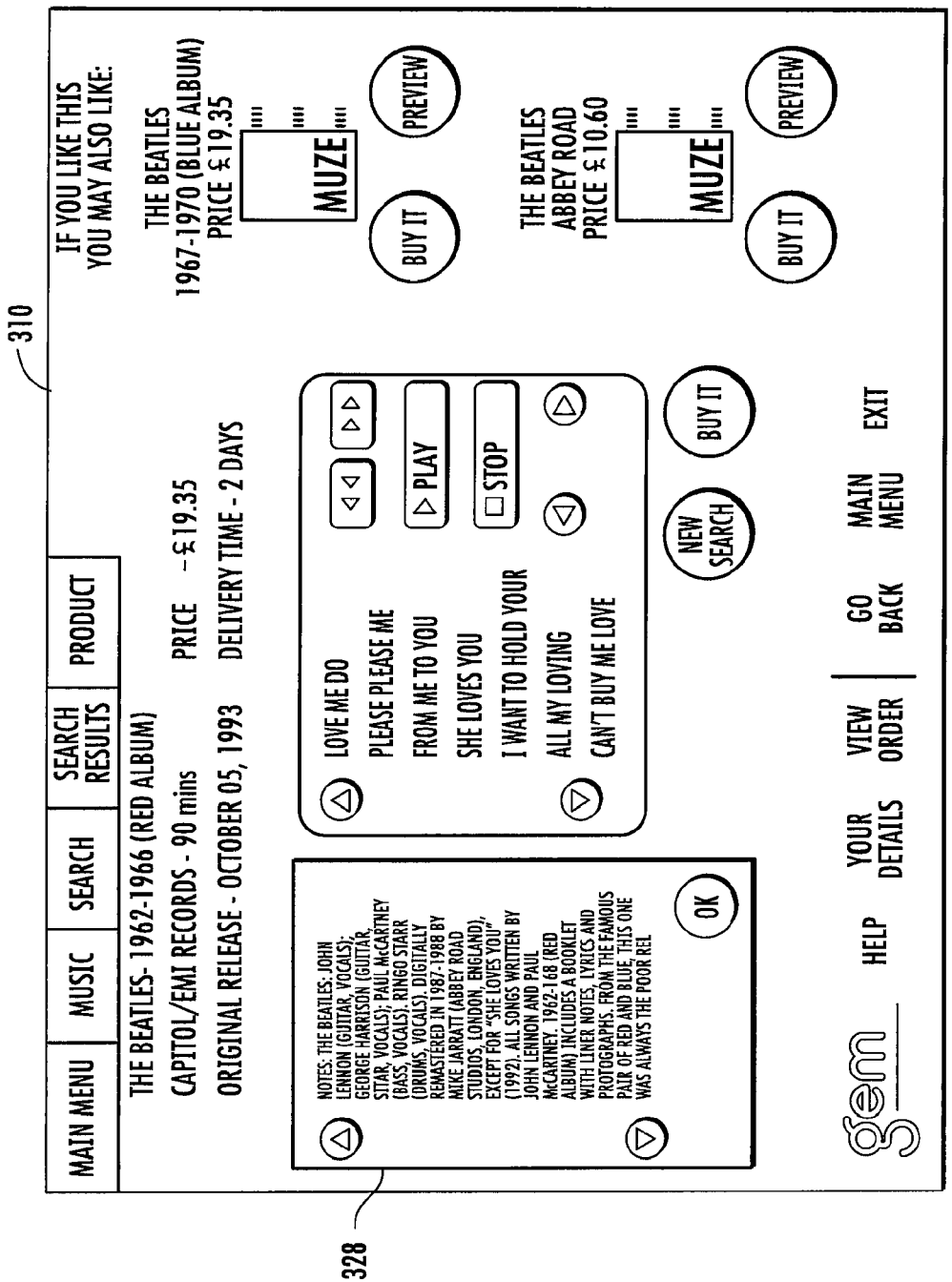
FIG. 10 is a screenshot of a second product details page displayed by a terminal of the first embodiment.
Figure 11:
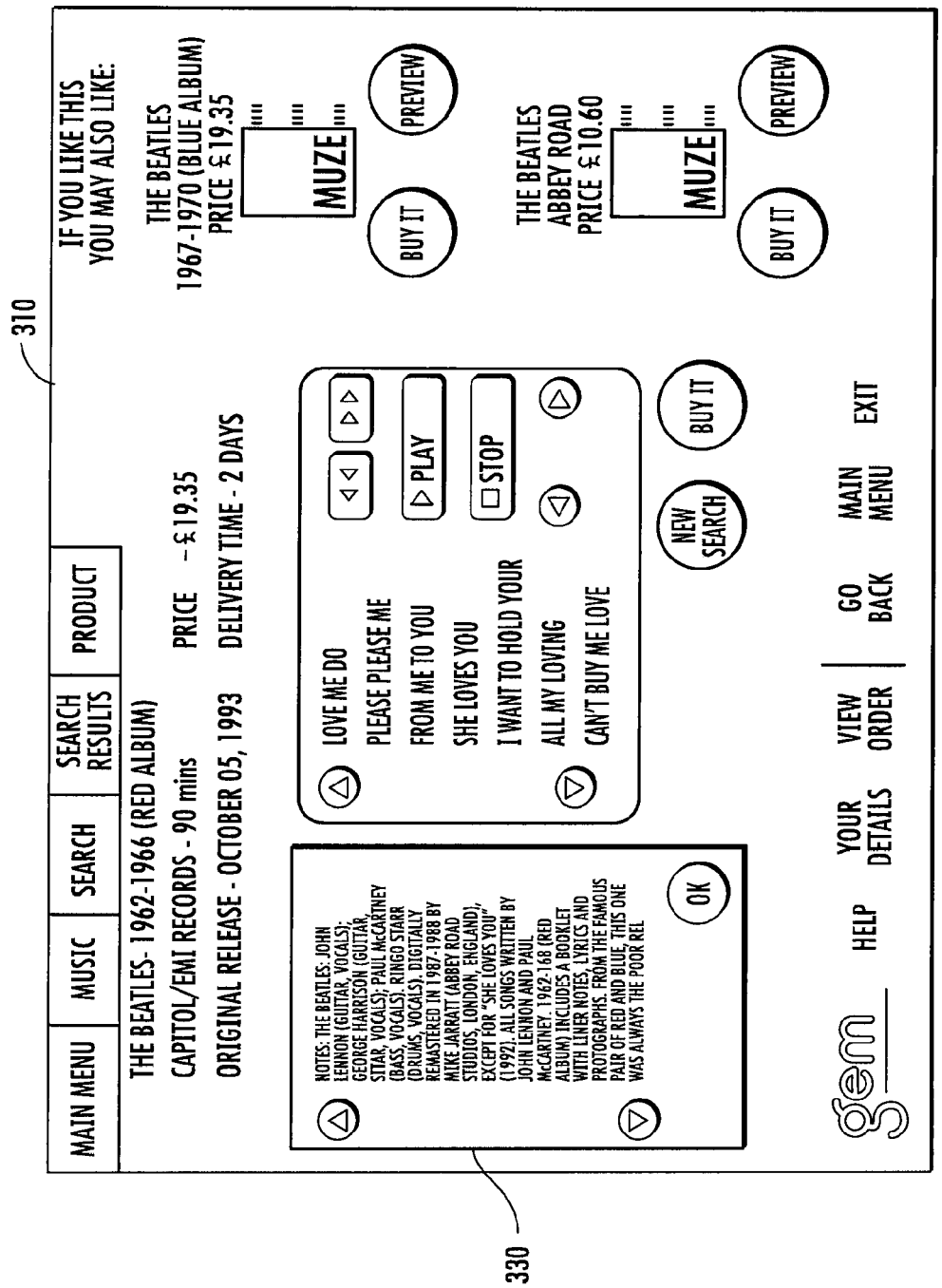
FIG. 11 is a screenshot of a third product details page displayed by a terminal of the first embodiment.

Pressing button 320 causes microcomputer 106 to display written notes containing information about the album in place of art clip 316 and buttons 320 and 322. FIG. 10 shows the product details page 310 with notes 328 displayed together with a pair of vertical scroll bars for moving the notes up and down, and an "OK" for returning to the art clip display. Similarly, pressing button 322 causes microcomputer 106 to display written reviews of the album in place of art clip 316 and buttons 320 and 322. FIG. 11 shows the product details page 310 with reviews 330 displayed together with a pair of vertical scroll bars for moving the reviews up and down, and an "OK" for returning to the art clip display.

If the customer decided not to buy the product, pressing button 324 of product details page 310 would return him/her to search by artist page 280 described above. However, assuming the customer decides to purchase the product, he/she presses button 326 which causes the Beatles Red Album to be added to the customer's shopping basket held in microcomputer 106 (as a temporary stored list of items to be purchased) and microcomputer 106 to display a shopping basket page shown at FIG. 12.

Figure 12:
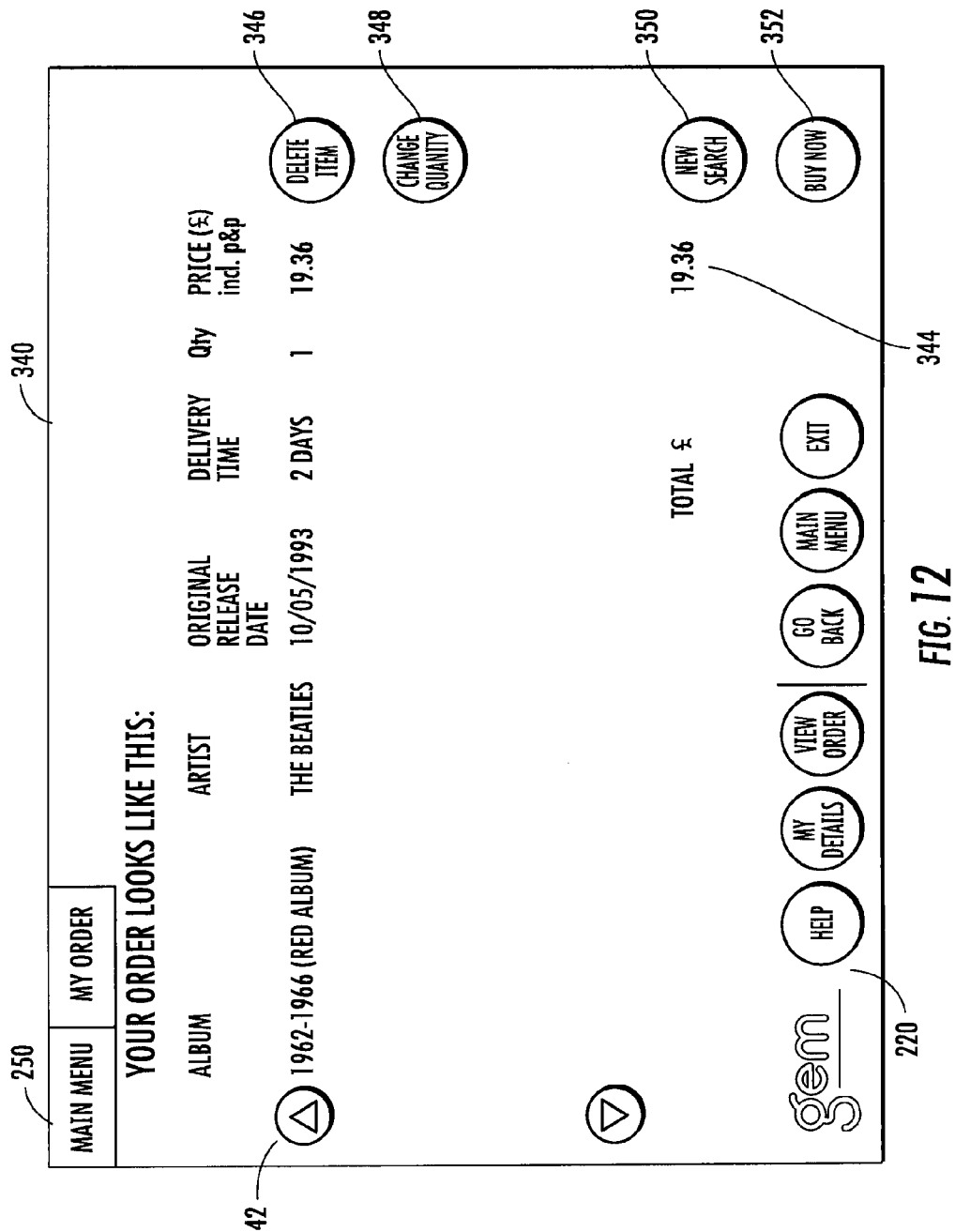
FIG. 12 is a screenshot of a shopping basket page displayed by a terminal of the first embodiment.

Shopping basket page 340 comprises menu location bar 250, standard menu bar 220 together with a section 342 showing descriptions of the customer's prospective purchases line by line, including a column for quantity, and the total price in box 344. In FIG. 12, there is only one product displayed since the customer has only selected one album to buy. Shopping basket page 340 also contains four buttons 346, 348, 350, and 352 which are, respectively, for deleting a selected product from the shopping basket, changing the quantity of items to be ordered for a selected product, returning to search by artist page 280 (to continue searching for additional items to add to the shopping basket), and proceeding to purchase the items in the shopping basket.

Figure 13:
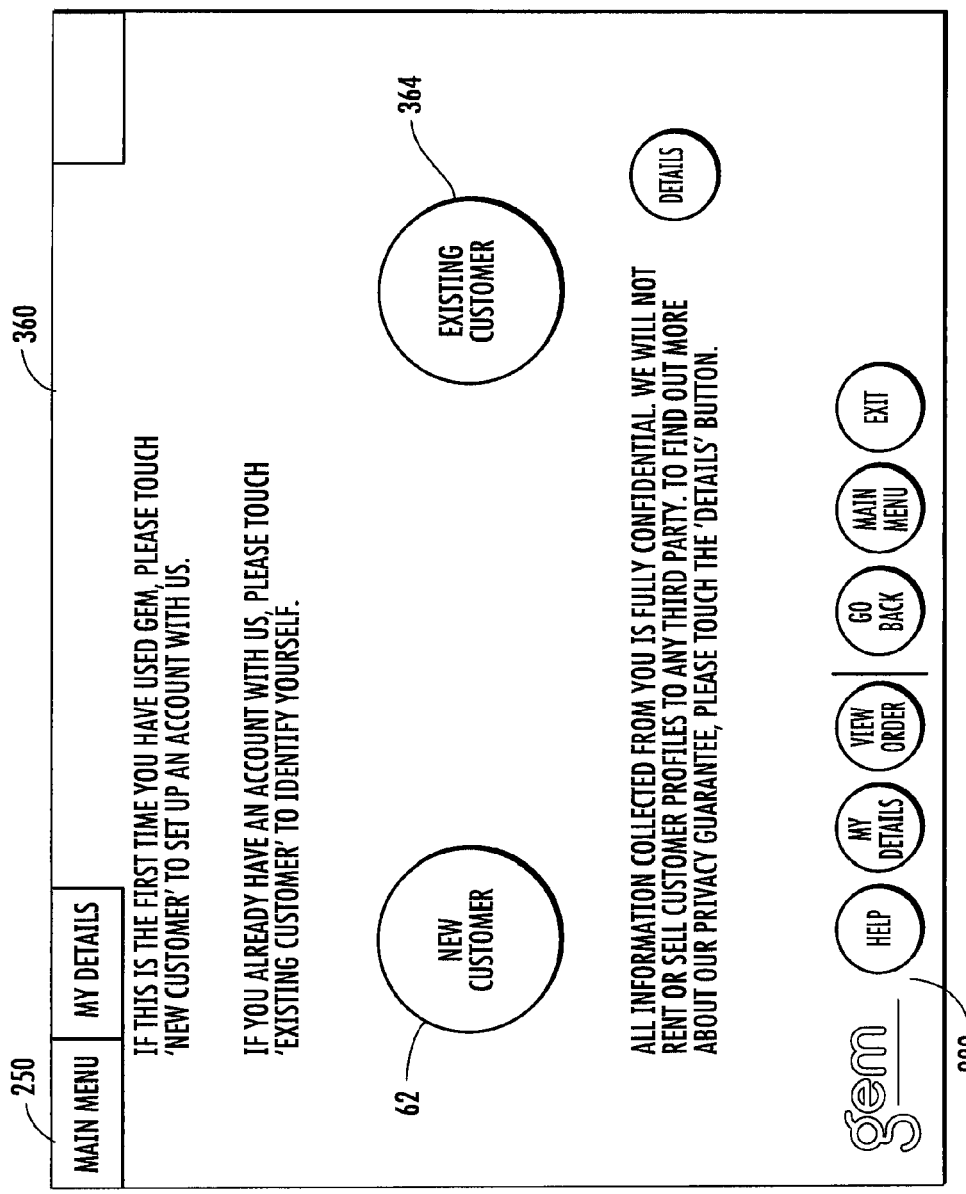
FIG. 13 is a screenshot of a customer identification page displayed by a terminal of the first embodiment.
Figure 14:
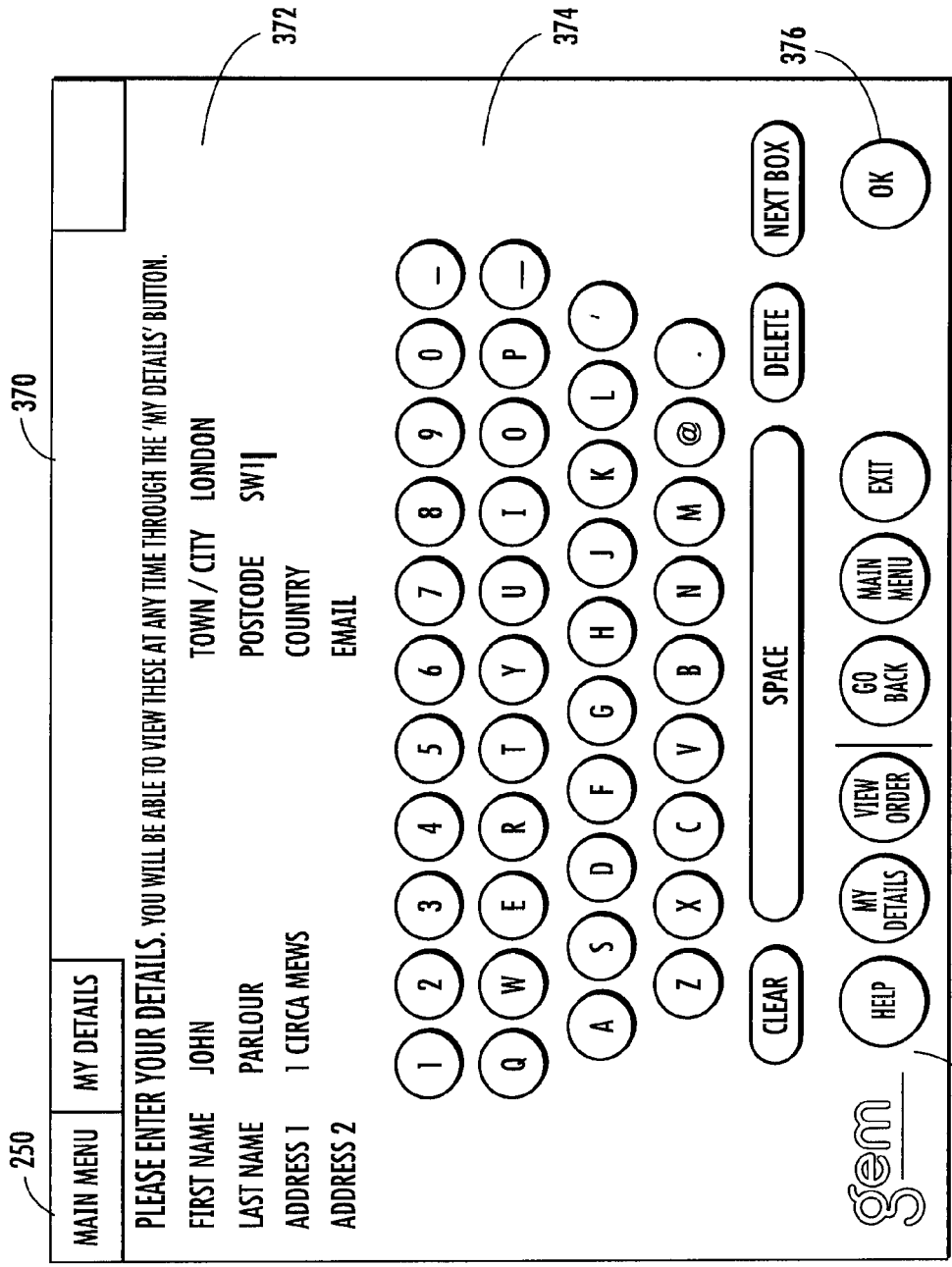
FIG. 14 is a screenshot of a new customer registration page displayed by a terminal of the first embodiment.

Wishing to proceed to purchase the Beatles Red Album, the customer presses input 102 at button 352 which causes microcomputer 106 to display a customer query page shown at FIG. 13. Customer query page 360 comprises menu location bar 250 and standard menu bar 220 together with a notice to the customer to either identify him/herself as a new customer by pressing button 362, or as an existing customer by pressing button 364. The customer query page 360 also contains a confidentiality policy notice 366. In this first scenario, the customer is new and, accordingly, presses button 362 causing microcomputer 106 to display a customer registration page shown at FIG. 14.

Figure 15:
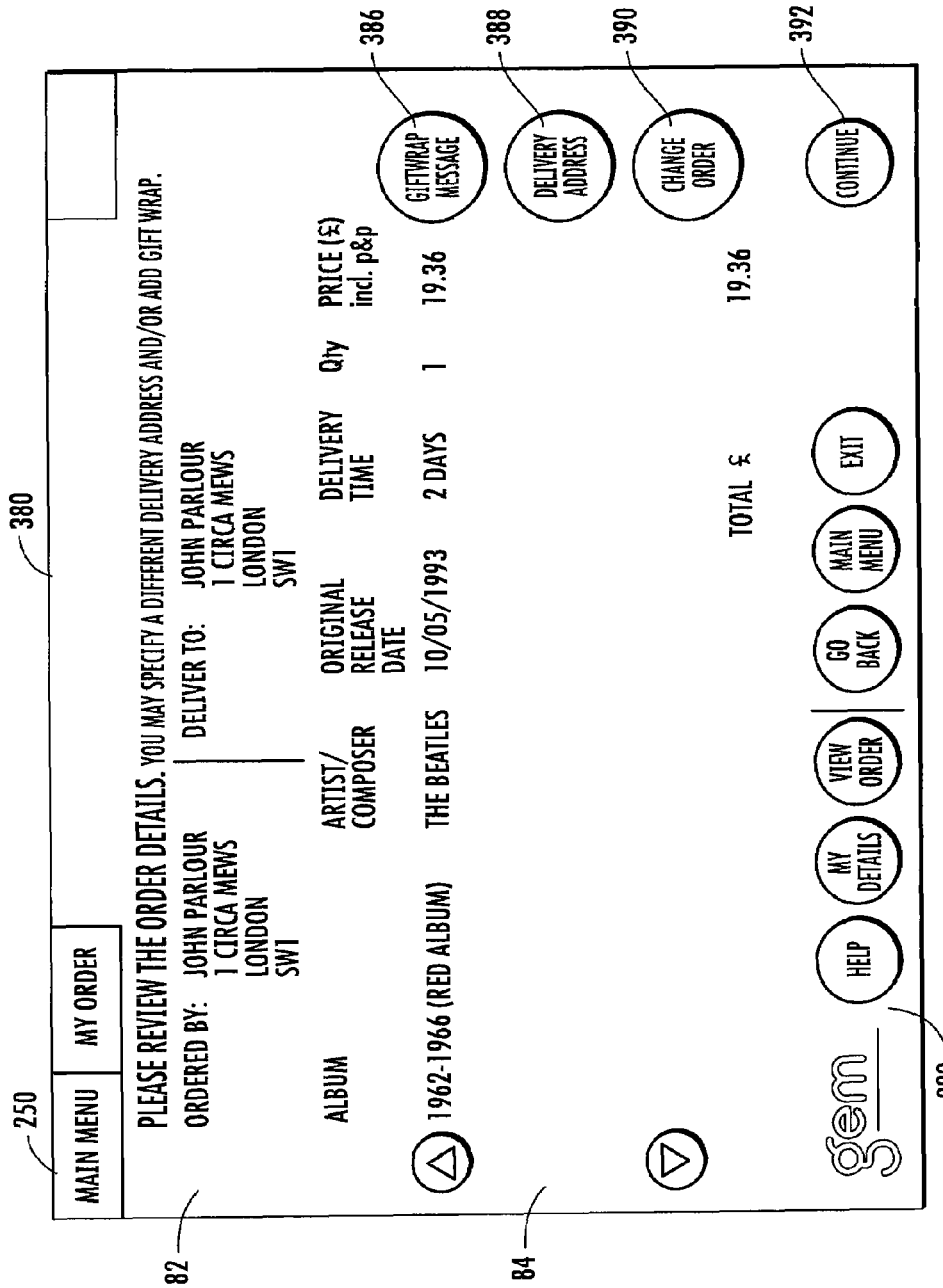
FIG. 15 is a screenshot of an order summary page displayed by a terminal of the first embodiment.
Figure 16:
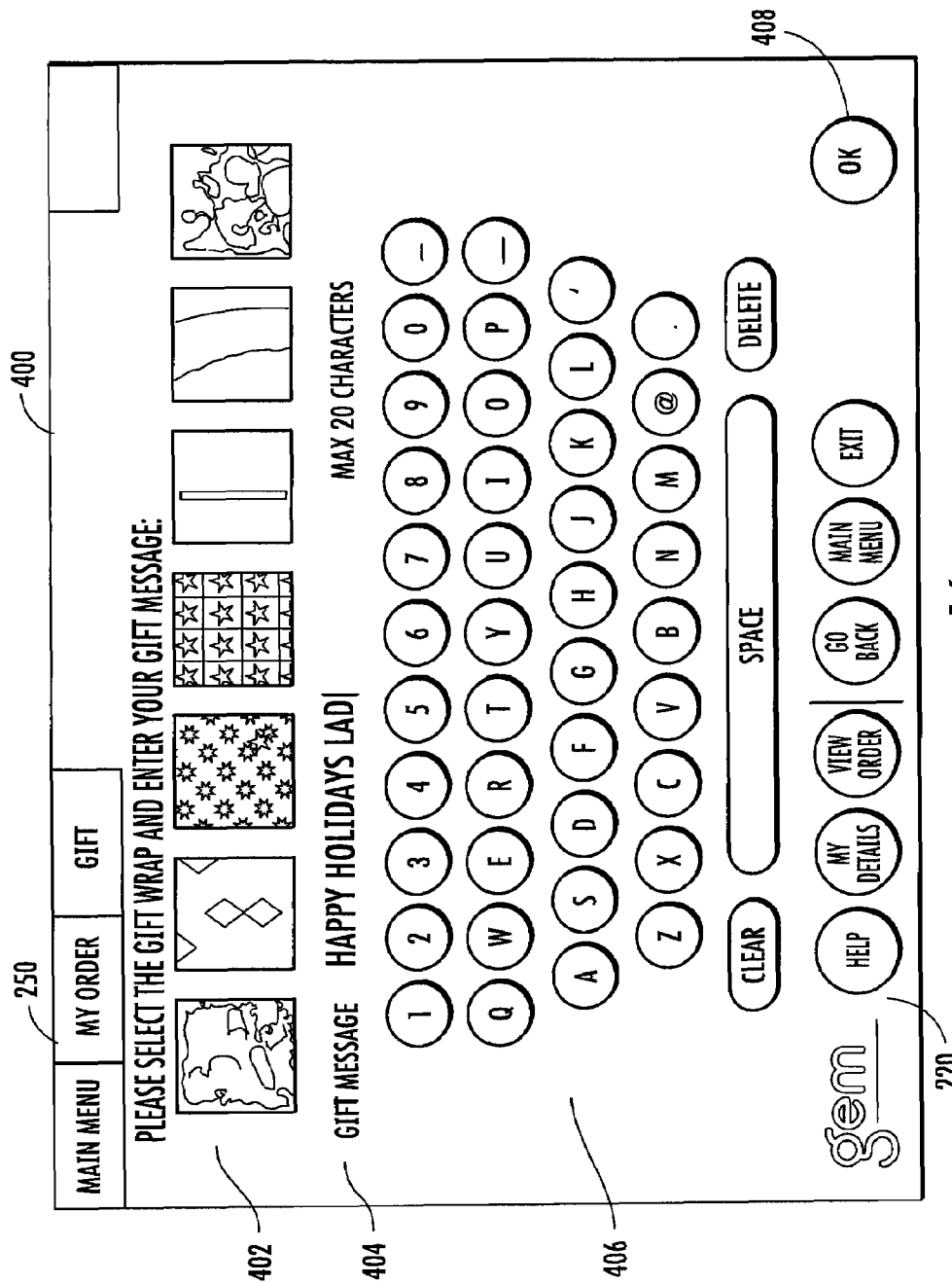
FIG. 16 is a screenshot of a giftwrapping and message entry page displayed by a terminal of the first embodiment.

Customer registration page 370 comprises menu location bar 250, standard menu bar 220 together with a set of text boxes 372 for displaying customer details such as first and last name, postal address including town/city, postcode and country and email address. Customer registration page 370 further comprises a display of a keyboard 374 as described above in relation to keyboard 284 of FIG. 7 with an additional key button marked "next box" for moving the point of entry of customer information between individual boxes of text boxes 372. The customer may use keyboard 374 to enter his name, postal and electronic addresses and press "OK" button 376 when finished. Alternatively, the customer may swipe a card obtained previously from the kiosk operators through credit card reader 110 to enter his details automatically, and then press the "OK" button 376. Once the customer details have been entered and the "OK" button is pressed the details are transmitted by microcomputer 106 to host computer 30 over the network link 20 for storage in customer database 50. Then microcomputer 106 displays an order review page as shown at FIG. 15.

Order review page 380 comprises menu location bar 250, standard menu bar 220 together with customer details section 382 showing the name and postal address of the customer and the delivery address (which defaults to the customer address), plus an order details section 384 showing the same details as prospective purchases section 342 described above in relation to FIG. 12. Order review page 380 further comprises four buttons 386, 388, 390, and 392 which are, respectively, for selecting giftwrapping of the order, changing the delivery address, changing the order, and continuing with the transaction. Pressing button 386 takes the customer to a gift requirements page shown at FIG. 16.

Gift requirements page 400 comprises menu location bar 250, standard menu bar 220 together with wrapping paper options 402 which may be selected by pressing the selected box, a text box 404 for entering a gift message using keyboard 406 and an "OK" button 408 for continuing when the customer has completed his/her requirements. Pressing button 408 returns the customer to order review page 380.

Pressing button 388 of order review page 380 takes the customer to a delivery address entry page 410 shown at FIG. 17 which comprises menu location bar 250, standard menu bar 220 together with a set of text boxes 412 for displaying delivery details such as first and last name of addressee, postal address including town/city, postcode and country and email address. Delivery address entry page 410 further comprises a keyboard 414 as described above in relation to FIG. 14. The customer uses keyboard 414 to enter the name, postal and electronic addresses of the deliveree and presses "OK" button 416 when finished to return to order review page 380.

Figure 18:
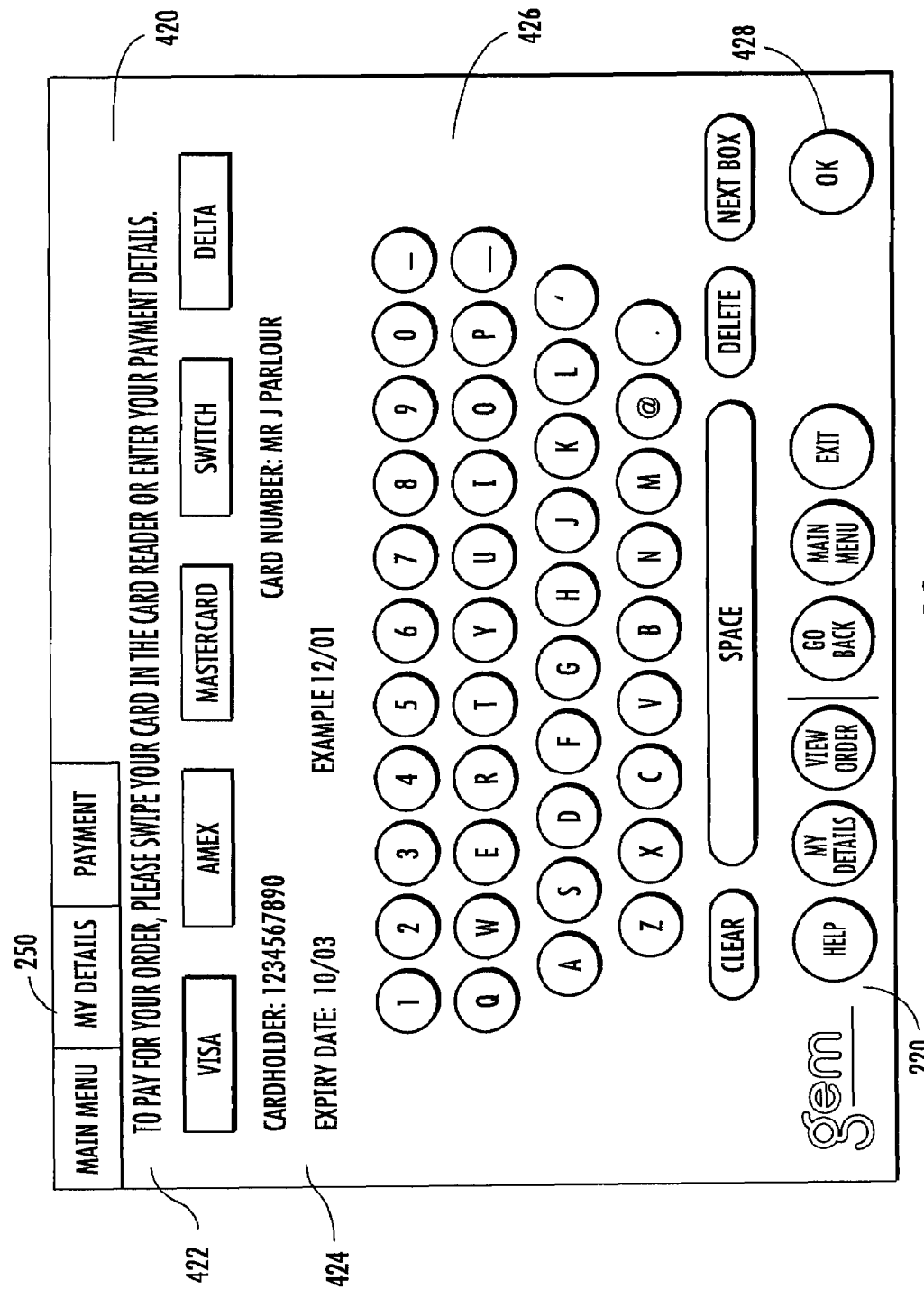
FIG. 18 is a screenshot of a payment details entry page displayed by a terminal of the first embodiment.

Pressing button 390 of order review page 380 takes the customer back to shopping basket page 340 in which the details of the order may be changed. However, if the customer is satisfied with the order as it stands, he/she may continue with the transaction by pressing button 392 which causes microcomputer 106 to display a payment information entry page as shown at FIG. 18.

Figure 19:
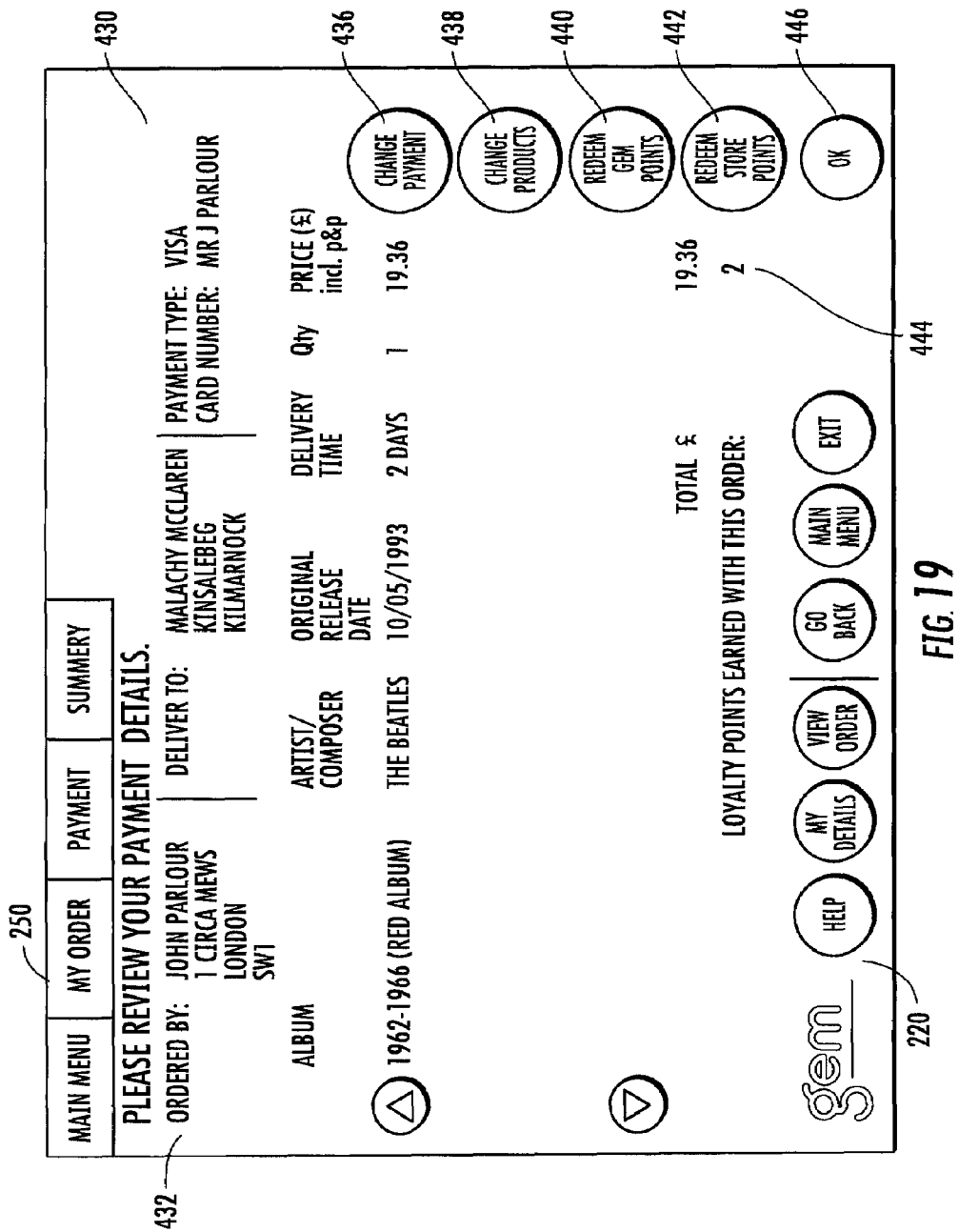
FIG. 19 is a screenshot of an order review page displayed by a terminal of the first embodiment.

Payment information entry page 420 comprises menu location bar 250, standard menu bar 220 together with payment card selection boxes 422, a set of text boxes 424 for displaying customer payment details, keyboard 426 and an "OK" button 428. To enter payment details the customer may either use selection boxes 422 and keyboard 426 to manually enter the details or simply swipe his/her payment card through card reader 110 whereupon microcomputer 106 receives the payment details automatically and displays them at text boxes 424. When complete the customer presses "OK" button 428 which causes microcomputer 106 to display an order summary page on display 104 as shown at FIG. 19.

Order summary page 430 comprises menu location bar 250, standard menu bar 220 together with payment details section 432 showing the name and postal address of the customer, the delivery address (by default, the customer's own address is initially displayed), and the payment details such as card type and number, plus an order details section 434 showing the same details as prospective purchases section 342 described above in relation to FIG. 12 but with an additional box 444 showing loyalty points to be earned with the order.

Order summary page 430 further comprises five buttons 436, 438, 440, 442, and 446 which are, respectively, for changing payment details (takes customer back to payment information entry page 420), changing products ordered (takes customer back to shopping basket page 340), redeeming loyalty points previously earned with the kiosk operator, redeeming loyalty points previously earned with the store in which the kiosk is located, and an "OK" button for proceeding with the transaction.

Wishing to proceed, the customer presses button 446 which causes microcomputer 106 to commence checking the customer's credit status with credit card company 90 via host computer 30 over network link 20 like a conventional retailer (or ATM) credit card reading station.

Figure 20:
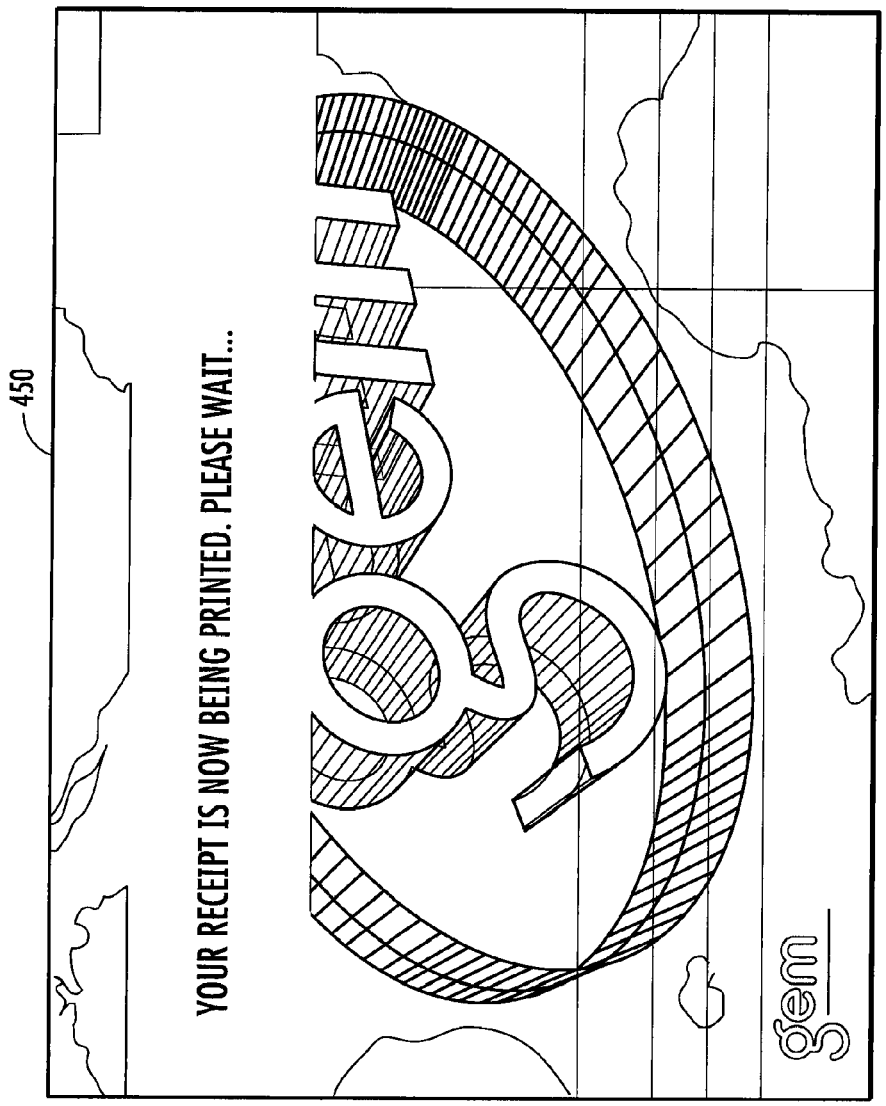
FIG. 20 is a screenshot of a receipt printing page displayed by a terminal of the first embodiment.

If satisfactory, microcomputer 106 instructs host computer 30 over network link 20 to amend customer database to include the order and prints a receipt for the customer using printer 108 of the kiosk whilst displaying printing receipt page 450, as shown at FIG. 20. Microcomputer 106 then places the order directly with the order and delivery company 90 via host computer 30 over network link 20. In a variant of the present embodiment, microcomputer 106 transmits the order to host computer 30 over network link 20 which stores the order for later transmittal to the order and delivery company 90 (for example at the end of every day).

The MUZE identification code (a unique code for each recording held in the MUZE database) may be sent to identify the item(s) to be purchased.

Figure 21:
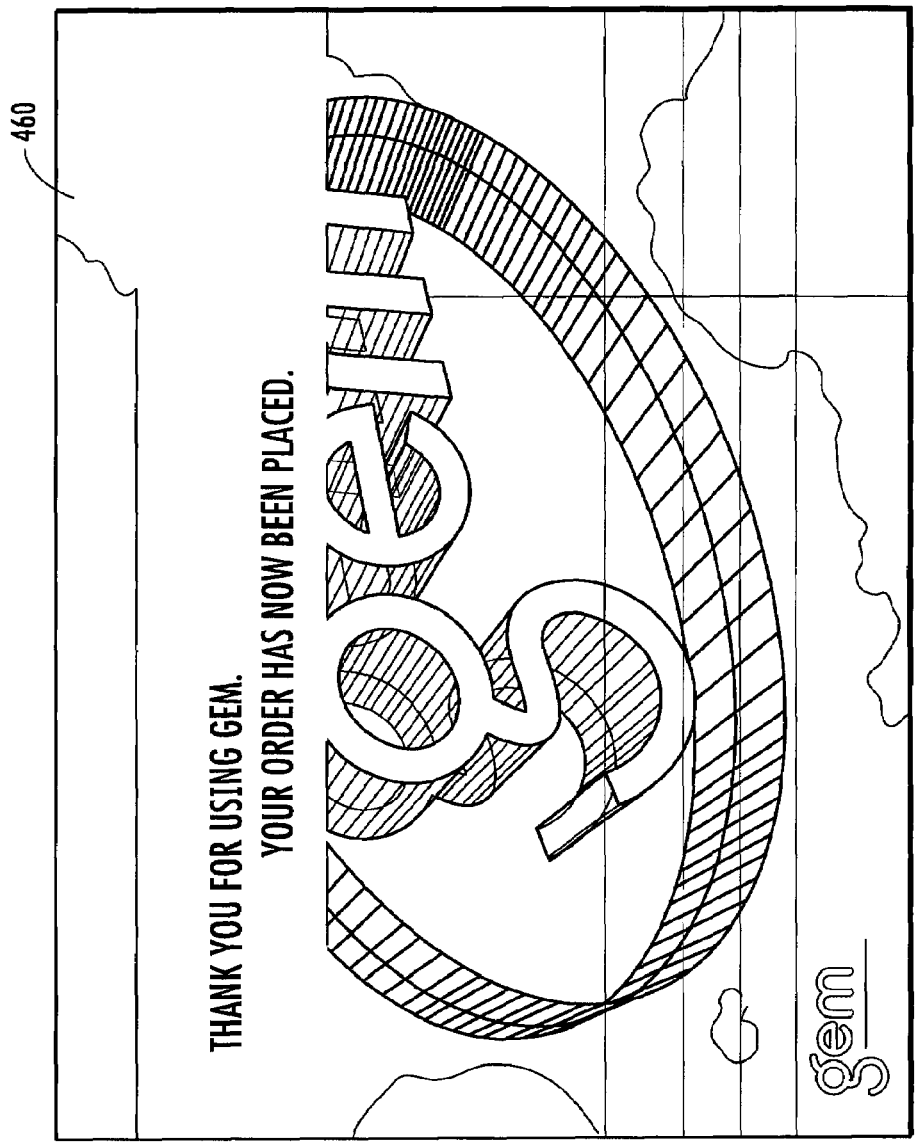
FIG. 21 is a screenshot of a confirmation of order page displayed by a terminal of the first embodiment.

When the receipt has been printed and the order placed or stored as described above, microcomputer 106 displays thank you page 460 as shown at FIG. 21 for a predetermined period of time and then reverts to displaying default page 200. This ends the first scenario.

Figure 22:
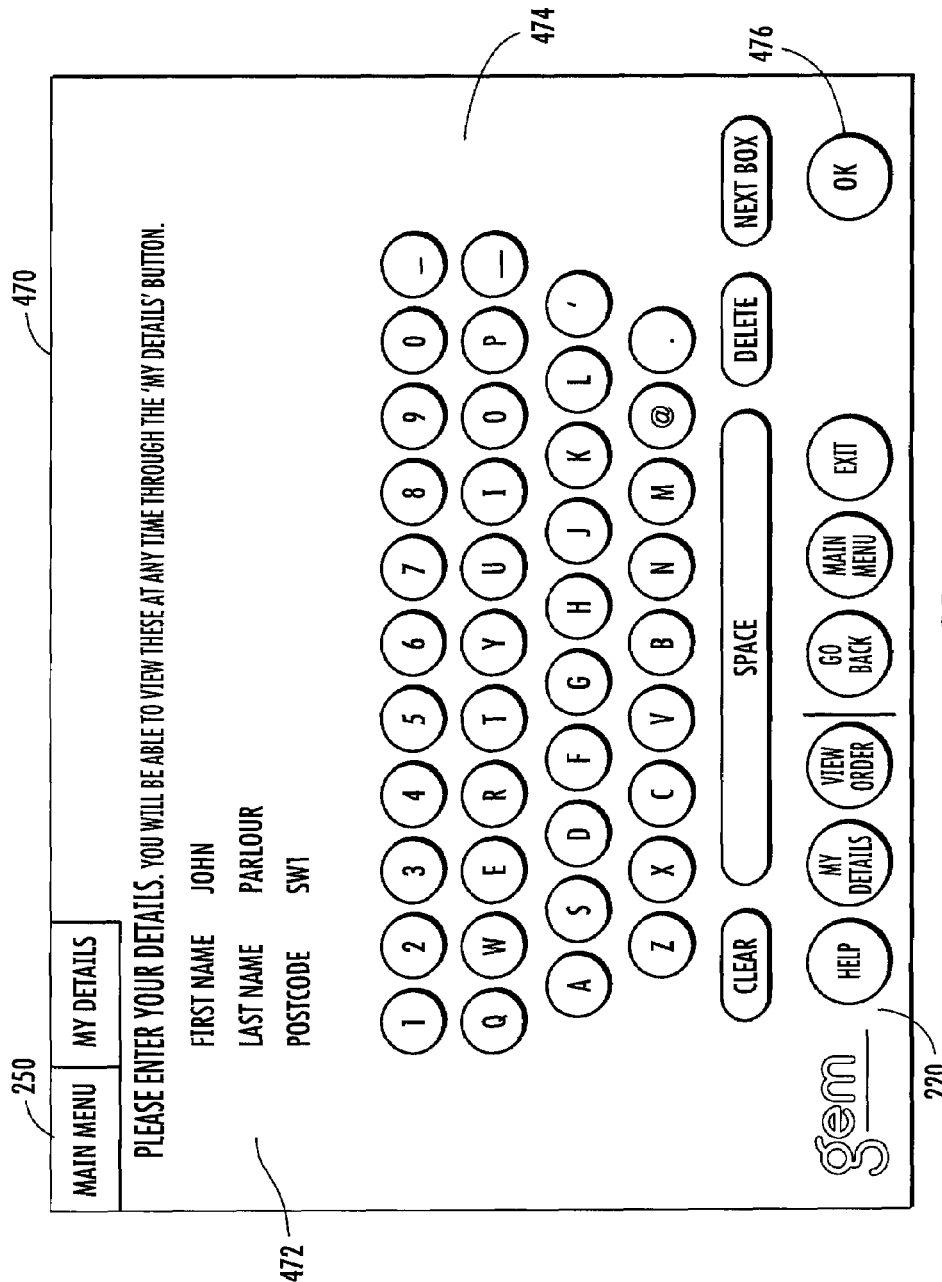
FIG. 22 is a screenshot of an existing customer registration page displayed by a terminal of the first embodiment.

In the second scenario, an existing customer logs onto the kiosk and inspects their details, previous order status and loyalty points. To begin with, kiosk 10a is in an unused state and microcomputer 106 displays default page 200 on display 104 as described above. Having touched the screen to start, the customer is presented with main menu page 210 as described above with reference to FIG. 4. In this scenario, however, the customer presses button 224 for entering his/her details and is presented with the customer query page 360 as shown above at FIG. 13. As the customer is an existing customer of the kiosk system, he/she presses button 364 and is presented with a customer identification page as shown at FIG. 22.

Figure 23:
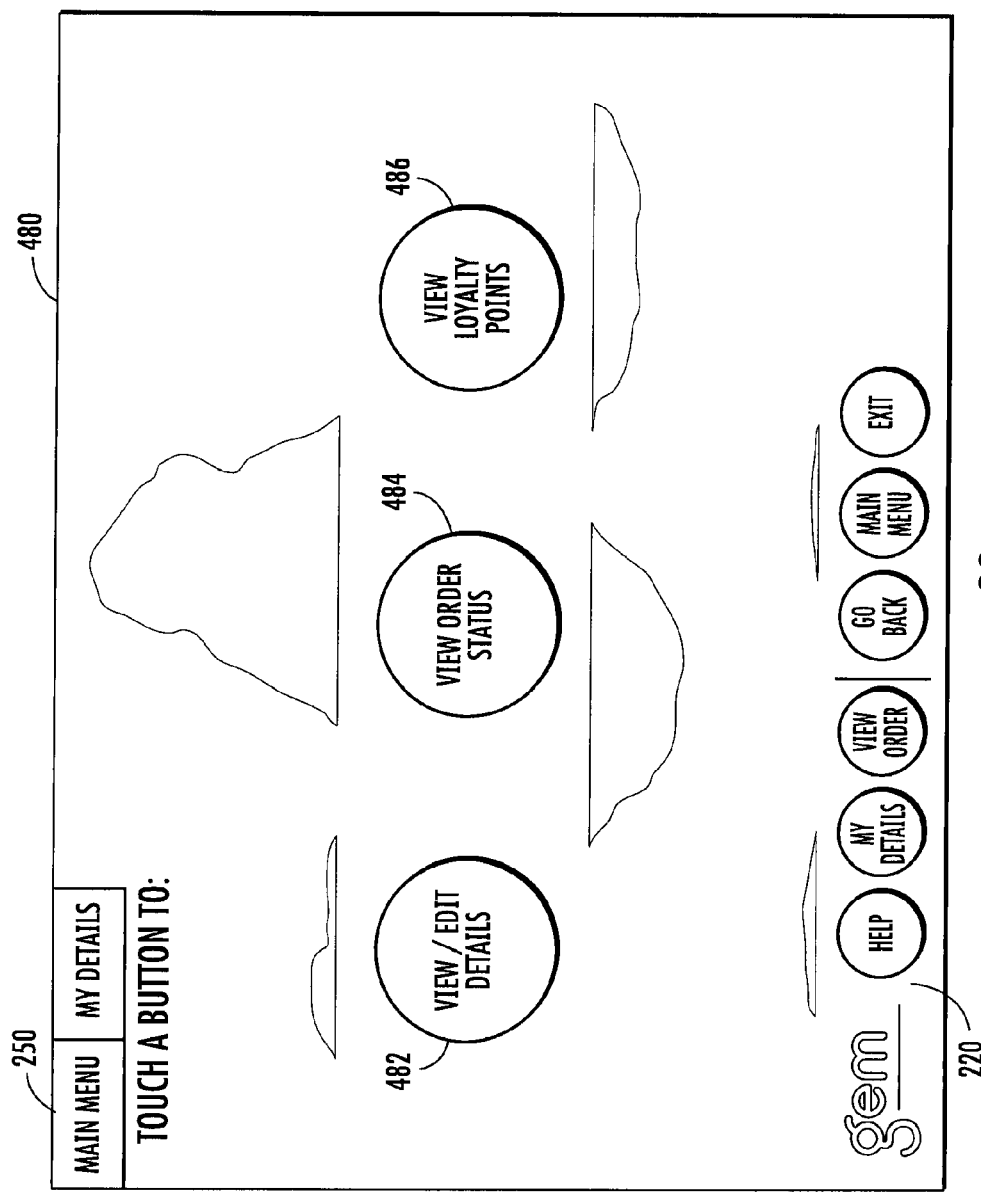
FIG. 23 is a screenshot of a customer menu page displayed by a terminal of the first embodiment.

Customer identification page 470 comprises menu location bar 250, standard menu bar 220 together with a set of text boxes 472 for entering details sufficient to identify the customer such as first and last names and postcodes. The customer may enter these manually using keyboard 474 or may identify him/herself by swiping his/her payment card or a kiosk system loyalty card through credit card reader 110 which automatically enters identifying details into the text boxes 472. When the customer has completed entering the details, he/she presses "OK" button 476 to proceed. This causes microcomputer 106 to request the customer records held in customer database 50 from host computer 30 and to display a customer menu on display 104 as shown at FIG. 23.

Customer menu page 480 comprises menu location bar 250, standard menu bar 220 together with three buttons 482, 484, and 486 which are, respectively, for viewing/editing customer details, viewing the status of existing orders, and viewing the customer's accumulated loyalty points. If the customer presses button 482, 484 or 486, he/she will be presented with the pages shown at FIGS. 24, 25 and 26 respectively.

Figure 24:
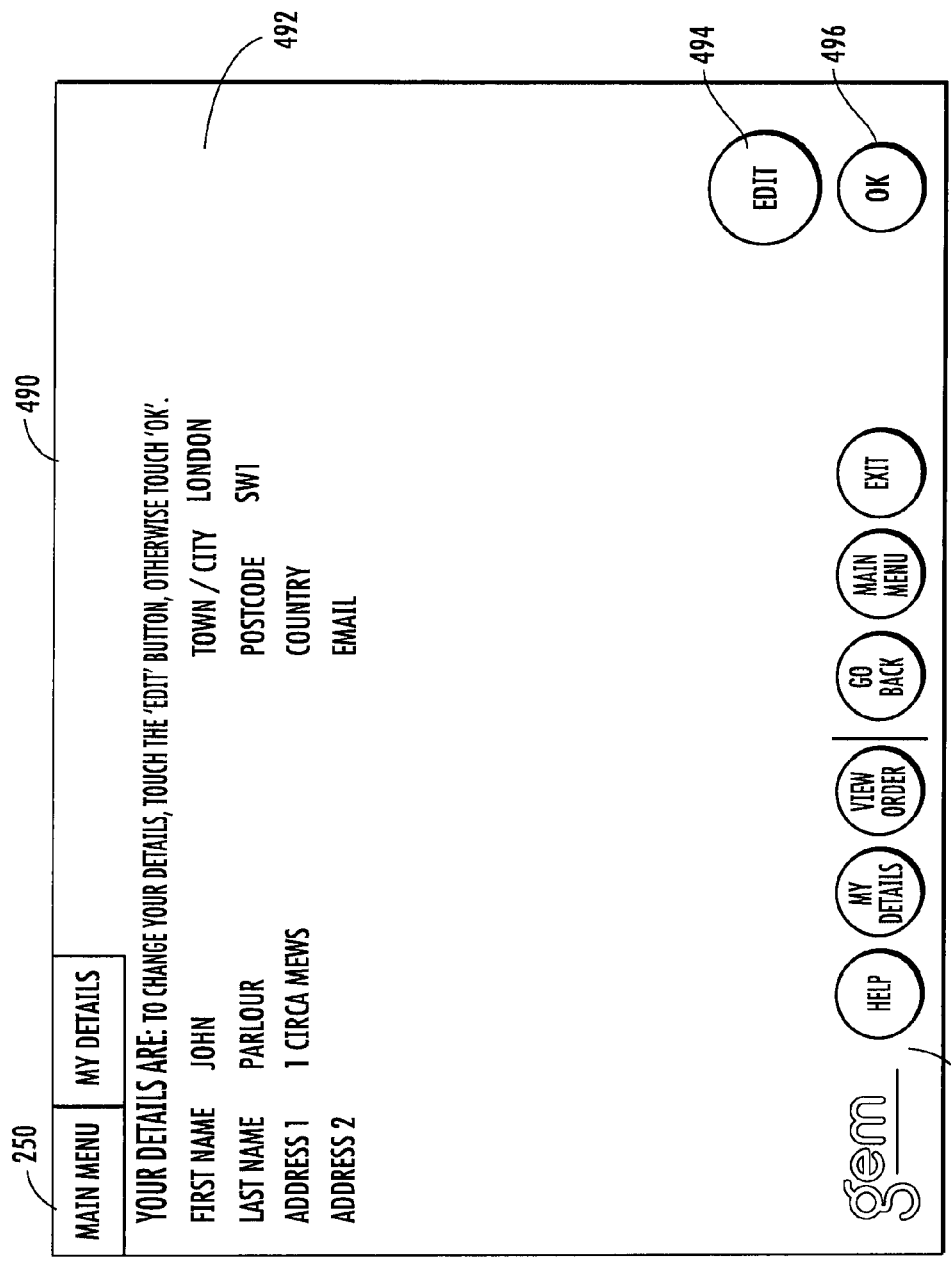
FIG. 24 is a screenshot of a customer details edit page displayed by a terminal of the first embodiment.

FIG. 24 shows the edit customer details page 490 which comprises menu location bar 250, standard menu bar 220 together with a set of text boxes 492 for displaying the customer's details and two buttons 494, which takes the customer to customer registration page 370 as described above and shown at FIG. 14 for editing the customer details (which new details are transmitted to host computer 30 for amending the customer record held in customer database 50), and an "OK" 496 for returning to the customer menu page 480.

Figure 25:
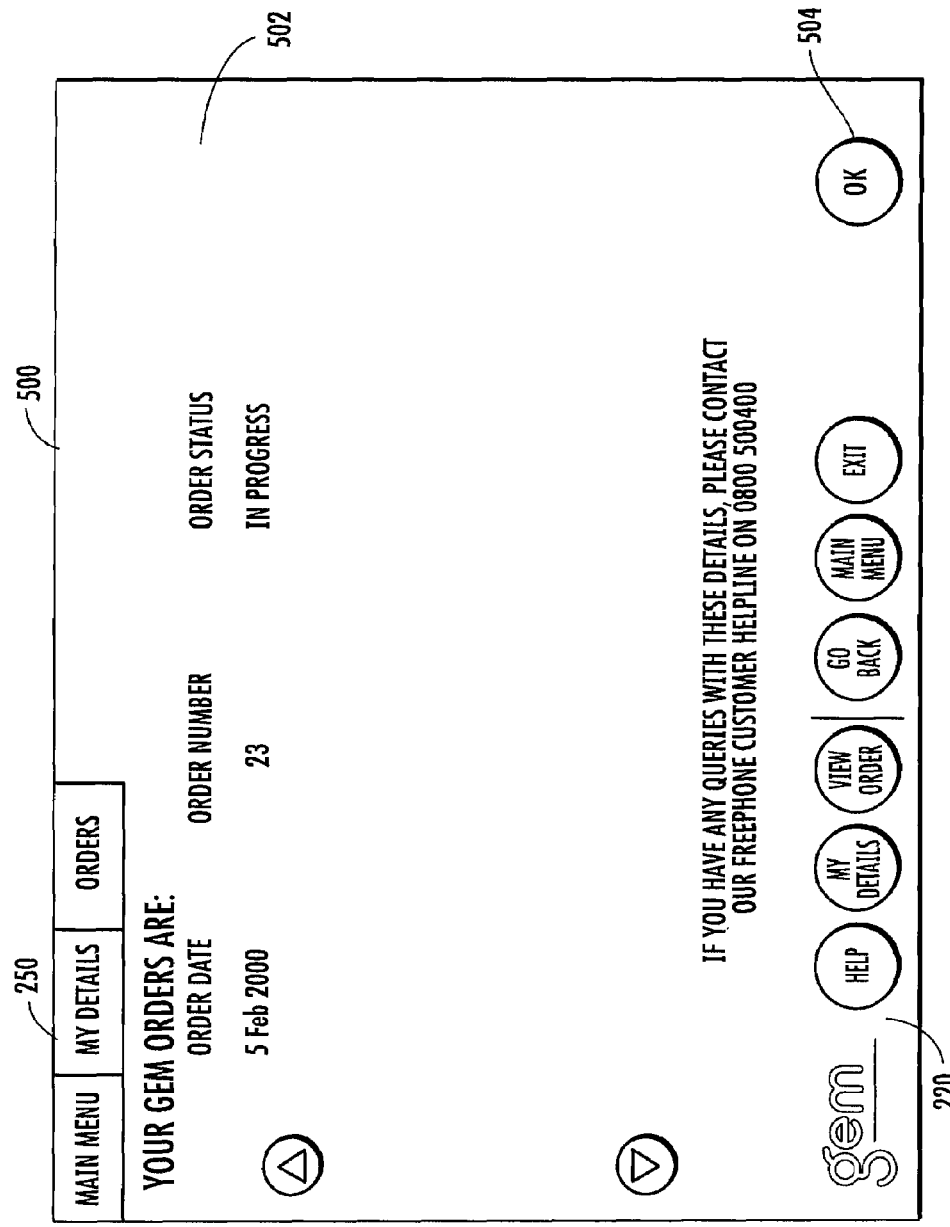
FIG. 25 is a screenshot of a customer order status page displayed by a terminal of the first embodiment.

FIG. 25 shows the order status page 500 which comprises menu location bar 250, standard menu bar 220 together with a section 502 for displaying the customer's order details including date of order, order number and status information for each order. When the customer has completed viewing the order details he/she may return to the customer menu by pressing "OK" button 504.

Figure 26:
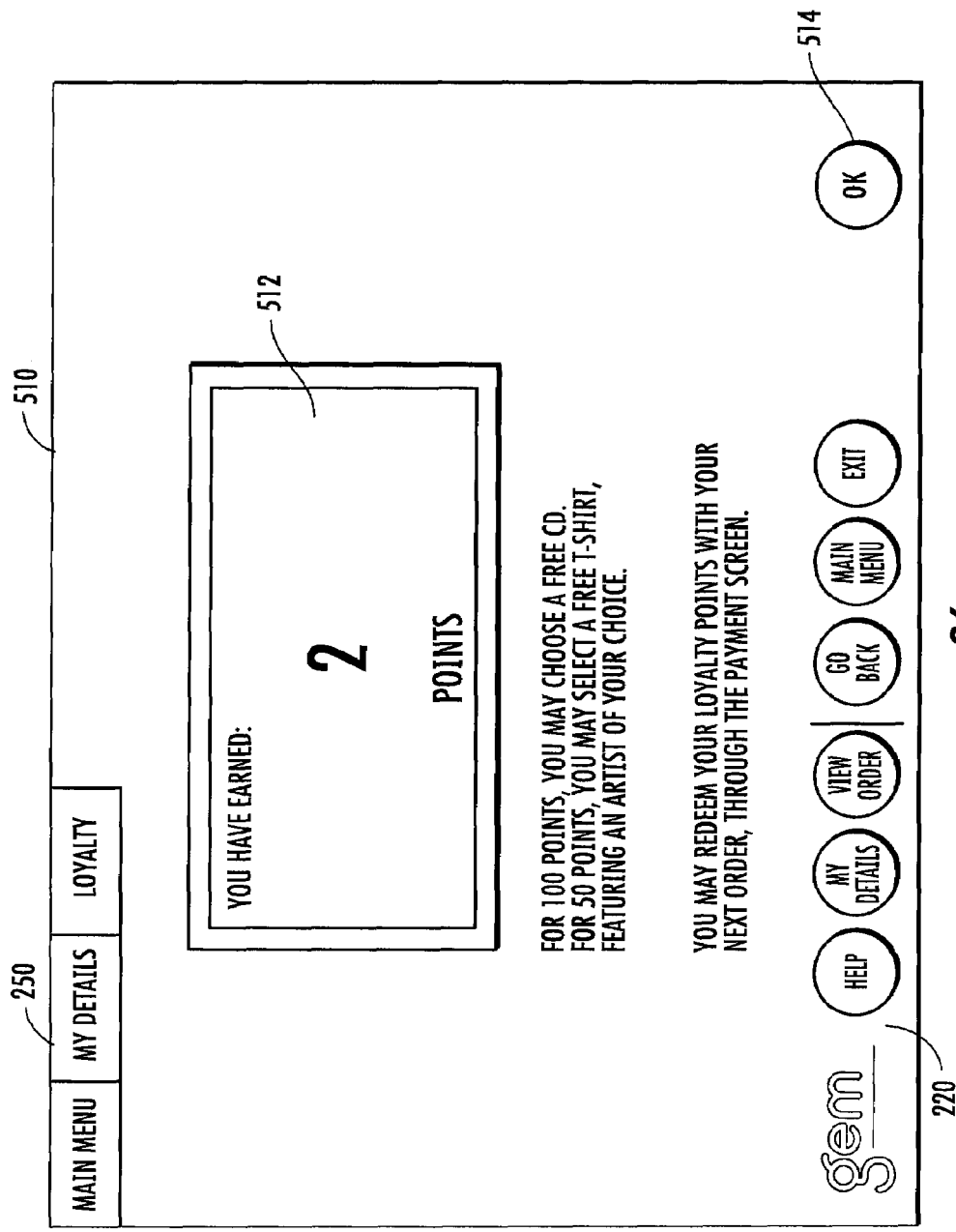
FIG. 26 is a screenshot of a customer loyalty points page displayed by a terminal of the first embodiment.

FIG. 26 shows customer loyalty points page 510 which comprises menu location bar 250, standard menu bar 220 together with a box 512 displaying the customer's loyalty points accumulated and an "OK" button 494 for returning to the customer menu page 480.

Next, the general procedure for interaction between the customer, microcomputer 106 and host computer 30 will be described with reference to FIGS. 27 and 28. To provide best possible response times for customers, microcomputer 106 uses intelligent caching to download data required from host computer 30. To do this microcomputer 106 maintains two data queues—a response queue and a download queue. The response queue maintains a list of responses to be presented to the customer using the display or headphones of the kiosk. The download queue contains a list of data required by microcomputer 106 from host computer 30—i.e. to perform the responses listed in the response queue. The response and download queues are dynamically alterable as data is input from the customer or from host computer 30. Moreover, the performance of responses is not held up by only partial data having been downloaded from host computer 30.

Figure 27:
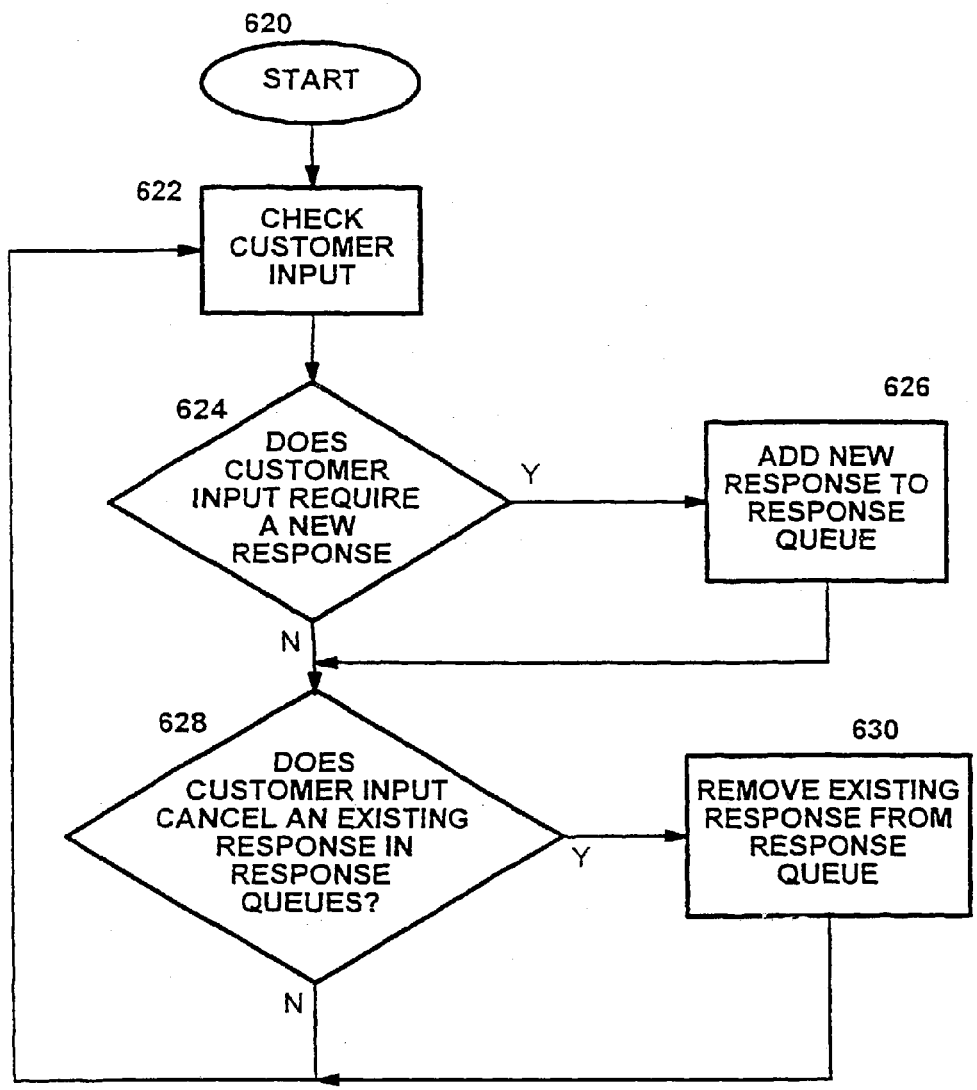
FIG. 27 is a flow diagram showing the response queuing process followed by a terminal of the first embodiment.

FIG. 27 shows the process for controlling the response queue. The process starts at step 620. At step 622, microcomputer 106 checks the data input by the customer. At step 624, microcomputer 106 determines whether the data input requires a new response to be performed to be added to the response queue. If it does, the process continues to step 626 and a new response is added to the response queue. The process then continues to step 628. If not, the process continues directly to step 628 at which microcomputer 106 determines whether the data input requires an existing response to be cancelled in the response queue. If it does, the process continues to step 630 and the cancelled response is deleted from the response queue. The process then continues to step 622. If not, the process continues directly to step 622.

Figure 28:
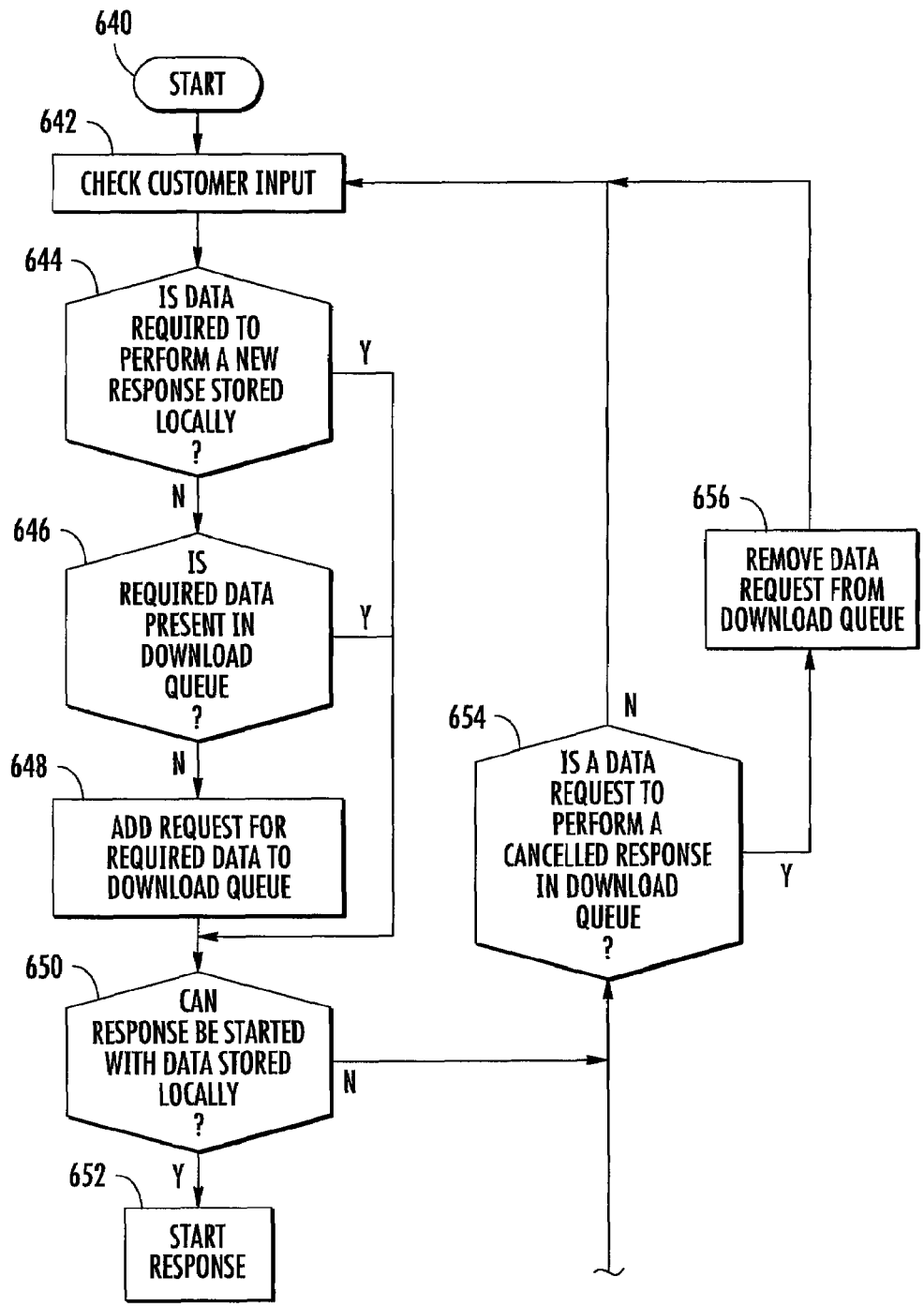
FIG. 28 is a flow diagram showing the download queuing process followed by a terminal of the first embodiment.

FIG. 28 shows the process for controlling the download queue. The process starts at step 640. At step 642, microcomputer 106 checks the response queue. At step 644, microcomputer 106 determines whether the data required to perform a new response is already stored locally—i.e. at microcomputer 106. For example, details of frequently requested works (new or popular recordings) may be stored locally for several days after initial downloading to the terminal 10. If it is, the process continues to step 650 described below. If, not the process continues to step 646 at which microcomputer 106 determines whether the data request is already present in the download queue. If it is, the process continues to step 650 described below. If not, the process continues to step 648 at which the new data request is added to the download queue. The process then continues to step 650 at which microcomputer 106 determines whether the new response can be started with data stored locally. If it can, the process continues to step 652 and the response is started, else the process continues to step 654 at which microcomputer 106 determines whether a data request to a perform a cancelled response is held in the download queue. If so, then the process proceeds to step 656 at which point the data request is removed from the download queue. The process then continues to step 642. If not, the process continues directly to step 642.

From the above described scenarios, it will be apparent that the terminals of the embodiment operate a locally stored JAVA program to present a series of screens each of which allows menu options and/or data input by the user. Based on the menu options and user input, further screens are displayed, and data is uploaded to, and received in response from, the host computer 30, to enable a user to make selections and play appropriate excerpts from works (in this case musical works). Because the kiosk terminals are self contained, the playing of such excerpts cannot be misused by local storage and reproduction, as would be possible in a PC.

Second Embodiment

In a second embodiment, the operation of the invention is substantially as described, except as indicated below.

Figure 31:
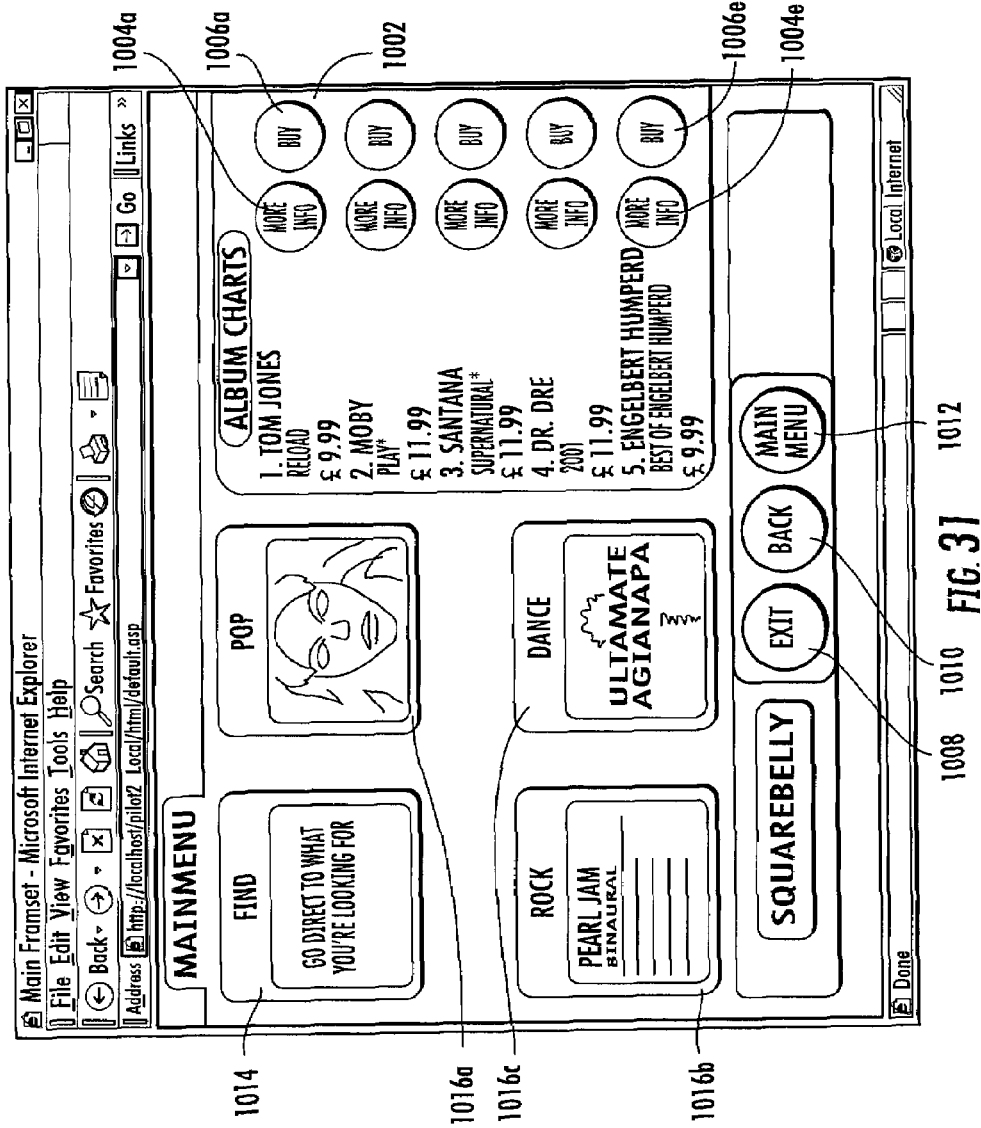
FIG. 31 is a screen shot of a main menu page according to a second embodiment.

FIG. 31 is shows a screen display of the main menu screen for a given type of playable work (in this case, music). It comprises a display area 1002 in which a record chart is displayed. By each entry (consisting of title, artists and price data) in the chart, a pair of buttons are provided; the first button of each pair 1004a, 1004b, 1004c, 1004d, 1004e allow the display of full information on the chart item concerned, and the second buttons 1006a-1006e allow the user to place a purchase order for the item concerned, in the manner described above.

At the bottom of the screen, three navigation buttons 1008, 1010, 1012 are provided. The first button 1008 enables the user to exit the ordering process. The second, 1010, returns the user to the immediately previous screen. The third, 1012, returns the user to the main menu (shown in FIG. 31).

A search button 1014 is provided, allowing the user directly to search for a record (as described above in relation FIG. 7).

Finally, three genre selection patents 1016a, 1016b, 1016c are provided which allow the user to select a genre main page, to be described in greater detail below. In FIG. 31, button 1016a corresponds to the pop genre; 1016b corresponds to the rock genre; and 1016c corresponds to the dance genre.

Figure 32:
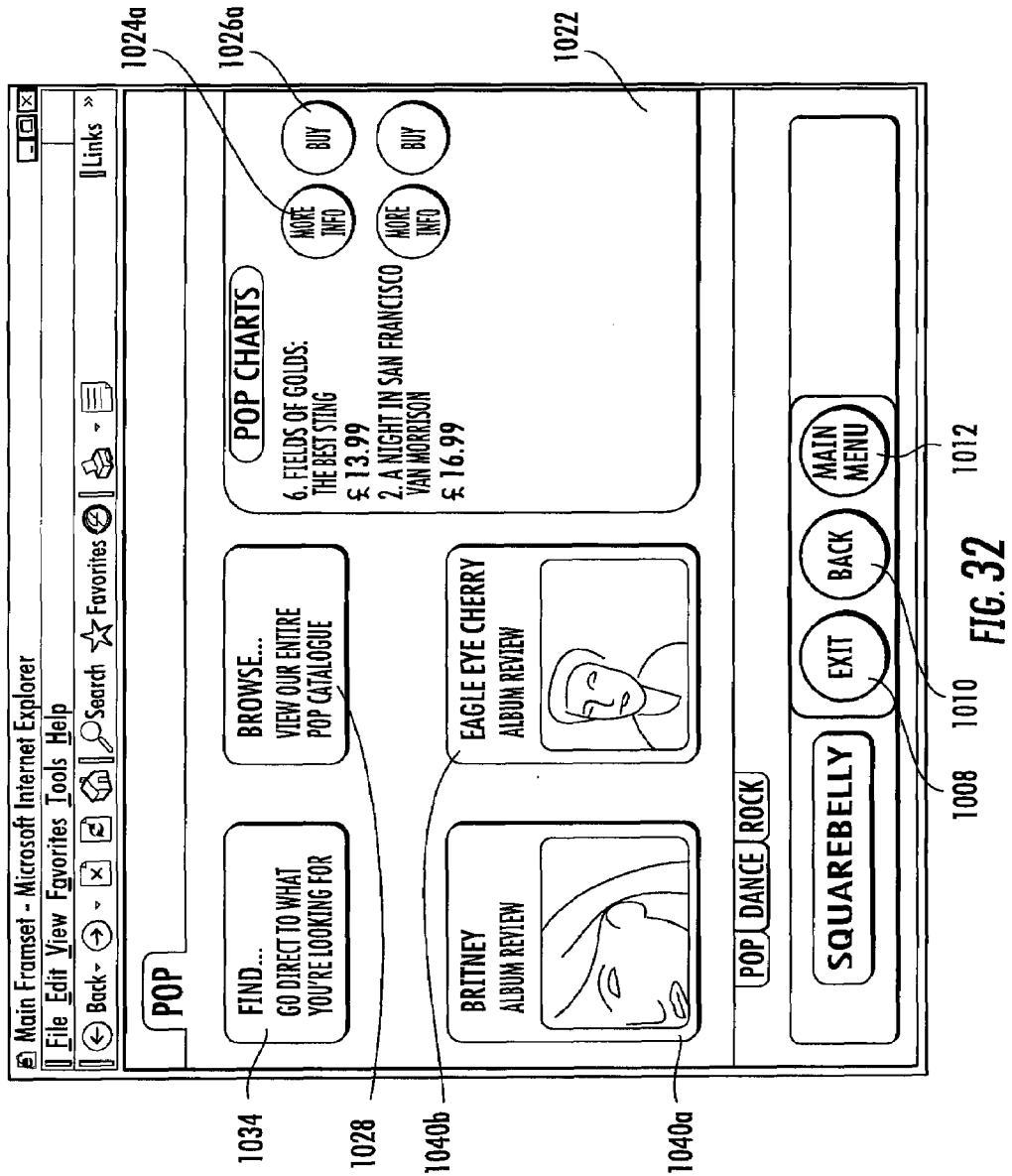
FIG. 32 is a screen shot of a genre menu page of the second embodiment.

FIG. 32 shows a genre main page (in this case the page displayed in the response to the user activating button 1016a). Selection of an area 1022 displays a genre-specific chart, with paired buttons 1024a-b, 1026a-b corresponding to 1004a and 1006a described above. Navigation buttons 1008-1012 are also present.

A button 1034 corresponds to the find button 1014 of the main menu of FIG. 31, but executes a search limited only to playable works in the genre concerned. A button 1028 allows the user to browse playable works in the pop genre, as will be disclosed below.

Finally, a pair of buttons 1040a, 1040b provide hypertext links to review articles, on particular playable works within the genre (e.g. album reviews), or, more generally, articles about the artists or other aspects of the genre. Thus, the genre screens (such as that of FIG. 31) offer magazine-like content to the user.

Selection of the button 1034, as mentioned above, results in the display of a screen similar to that of FIG. 7, with a displayed keyboard for entry of the name of an artist.

Figure 33:
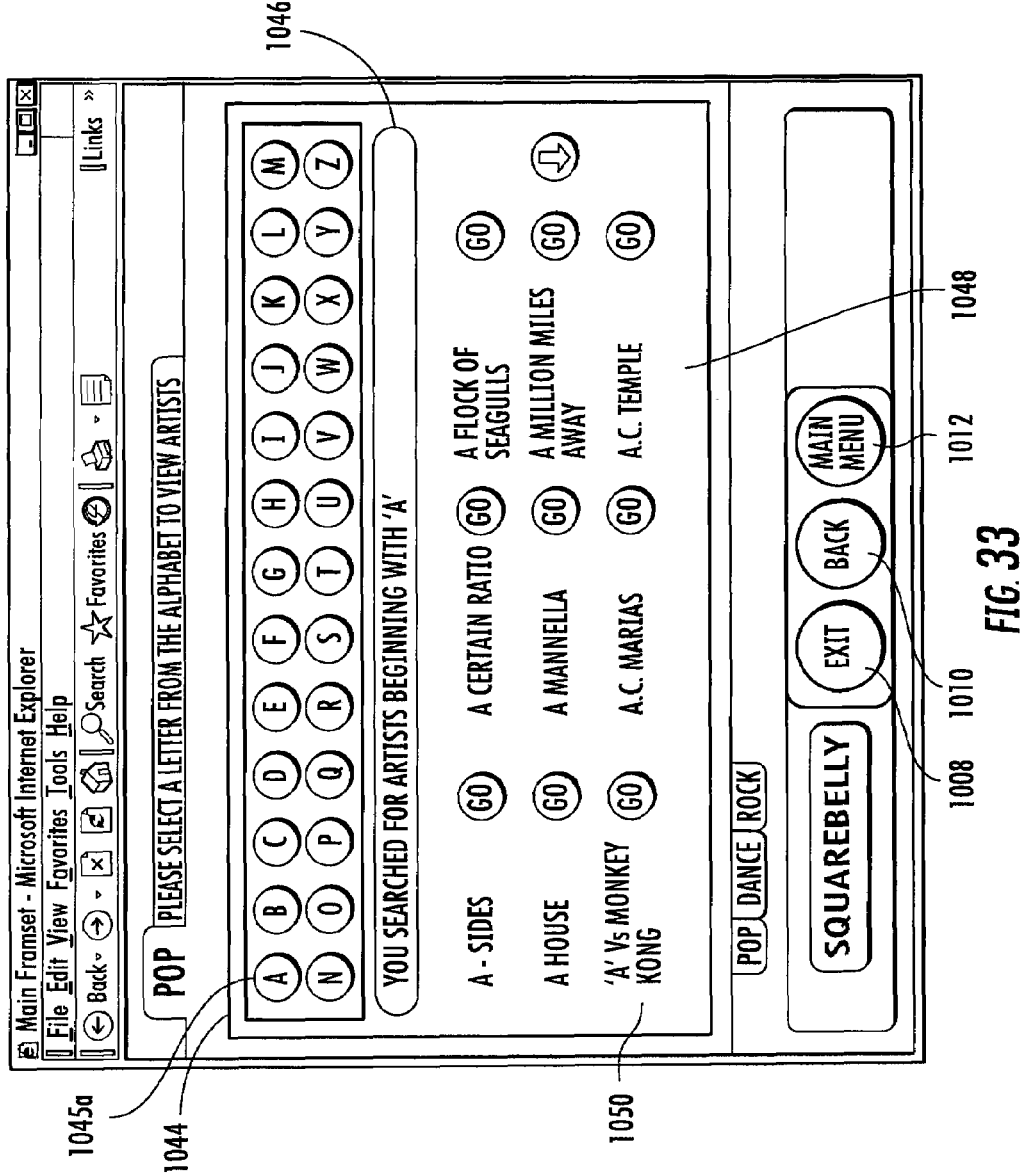
FIG. 33 is a screen shot of a browse page of the second embodiment.

Referring to FIG. 33, selection of the browse button 1028 causes the display of a screen having an area 1044 with 26 keys corresponding to the letters of the alphabet. Also provided are areas 1046 and 1048, which are initially blank. As with FIGS. 31 and 32, buttons 1008, 1010, 1012 are present for navigation.

On selection of a key (for example, the key 1045a corresponding to the letter "A"), the microcomputer 106 causes a search of the database 40 (as described above in relation to FIG. 7), to locate all artists with works classified as being in the pop genre and with names beginning with the letter "A", in the database 40.

On completion of the search, a search statement ("You searched for artists beginning with" followed by the letter selected) is displayed in area 1046, and one or more artists located by the search are displayed in the area 1048. The display consists of the name of the artist next to a select button 1050 (one button is provided for each displayed artist).

Figure 34:
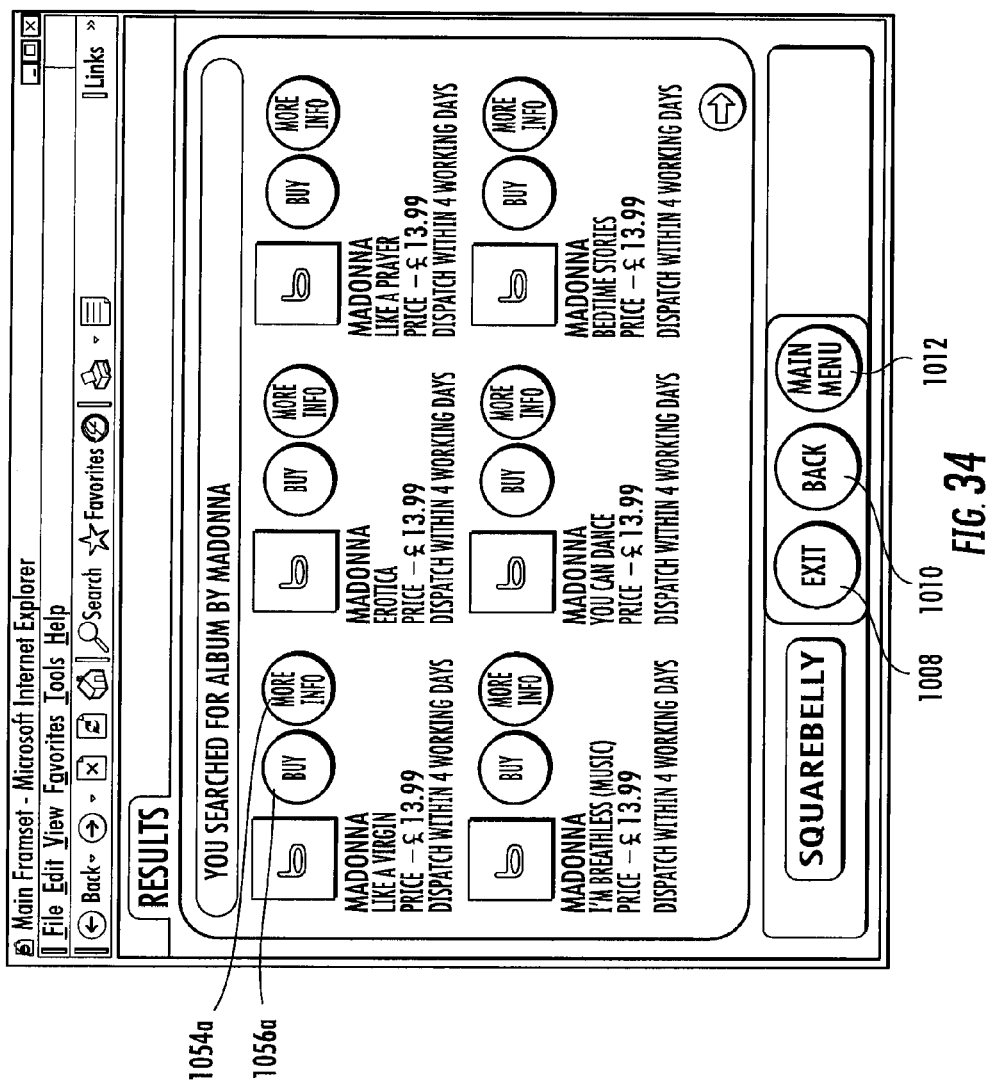
FIG. 34 is a screen shot of a results page of the second embodiment.

Referring to FIG. 34, on selection of an artist from the browse results screen of FIG. 33, or from the search screen (e.g. that of FIG. 7), a list of all available products by the artists is displayed consisting of brief details of title, price, and availability (e.g. length of time to despatch), accompanied by a pair of buttons 1054, 1056 each corresponding to the buttons 1004, 1006 of FIG. 31 and enabling the user to either obtain further details (button 1054a-f) such as track listings or audio clips, or to order the product (buttons 1056a-1056f).

Figure 35:
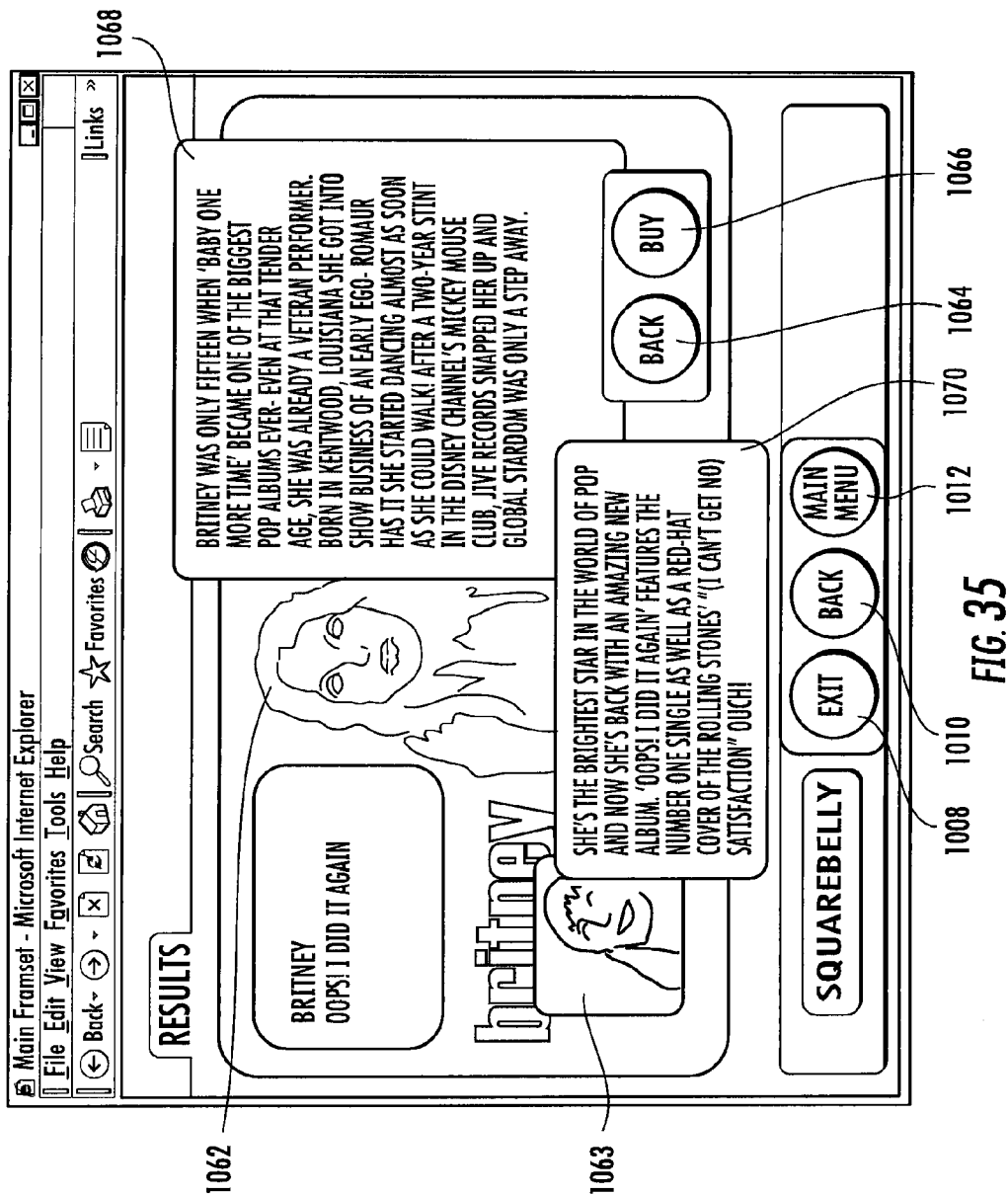
FIG. 35 is a screen shot of a review page of the second embodiment.

Referring to FIG. 35, on selection of one of the buttons 1040a, 1040b from the genre screen of FIG. 32, material on a product in the genre is displayed; for instance comprising pictures 1062, 1063 of the artist, and text boxes 1068, 1070 containing text reviewing the work. Also provided are buttons 1064, 1066 correspond to buttons 1004, 1006 of FIG. 31 and offering the user either more information (button 1064) or the opportunity to order the work (1066).

Thus, in this embodiment, as in the first, the user is offered more than a catalogue and an opportunity to buy; the system provides the opportunity for a user interested in a genre to browse, keep up to date, and learn more; before, after, or instead of, purchasing.

The reader will understand that aspects of the second embodiment may be used separately of those of the first.

Third Embodiment

In a third embodiment, the operation of the invention is substantially as described in the first and second embodiments, except as indicated below.

In this embodiment, the above-described browse-by-artist function is modified to search only a stored most popular artiste list (of, for example, about 1000 artistes), selected from all the artistes stored in the database. This reduces the volume of results listed, thus making the choice simpler for the user. Also, the list may be stored locally, reducing the search time.

Figure 36:
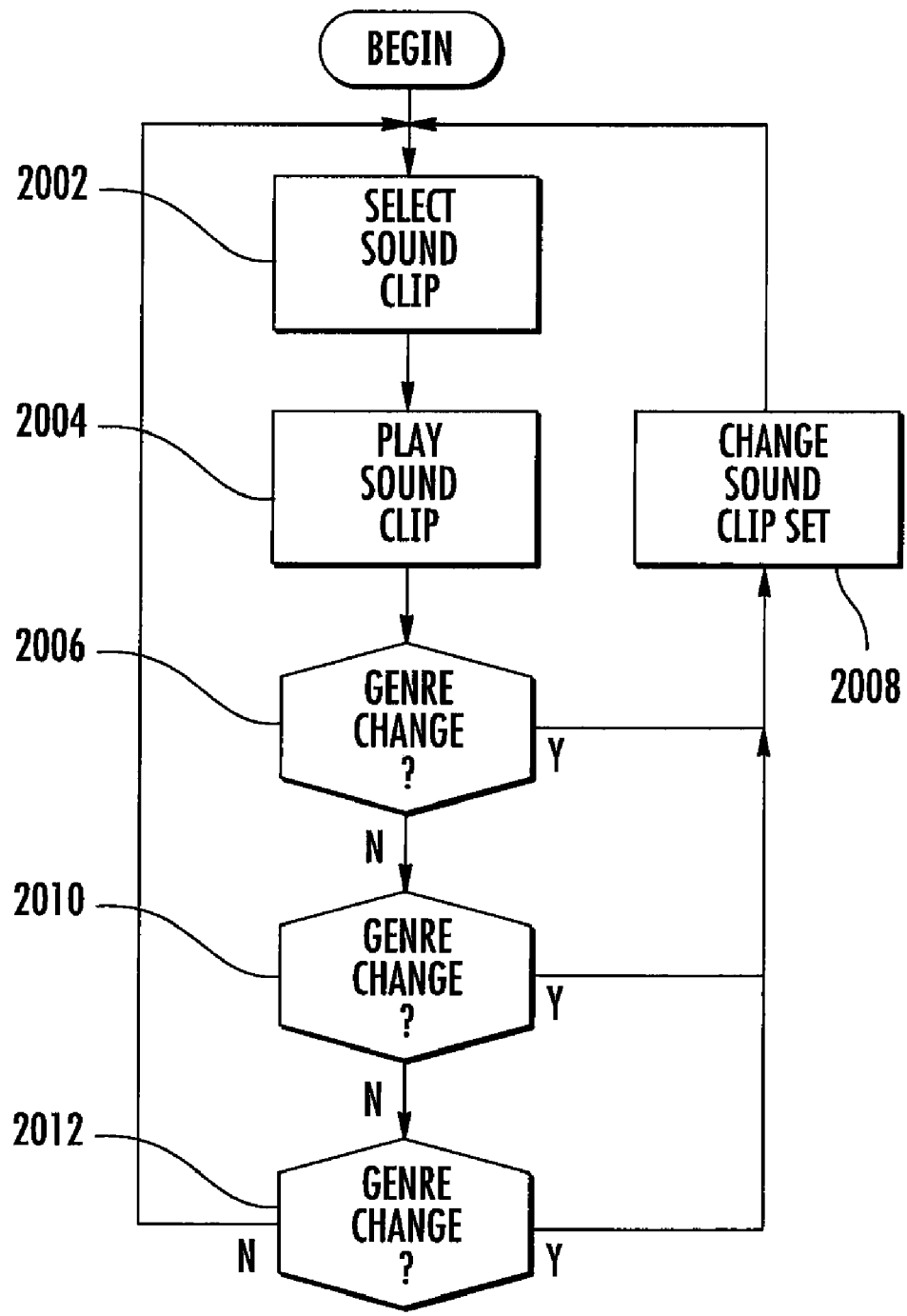
FIG. 36 shows a process of selecting and playing background music.

In this embodiment, referring to FIG. 36, initially (steps 2002 and 2004) a randomly selected sequence of sound clips from the database is reproduced (selected for example from the singles chart). A first button (not shown) on the screen allows the user to purchase the currently playing selection, and a second on-screen button allows the user to access information on the track which is retrieved and displayed on the screen.

On each occasion when the user selects a genre (step 2006), the set of sequences of sound clips from which the "now playing" clip is selected is changed to correspond to works in the selected genre (step 2008), rather than the general charts, and a new clip is selected therefrom.

On each occasion when the user selects an artiste (step 2010), the set of sequences of sound clips from which the "now playing" clip is selected is changed to correspond to works by the selected artiste (step 2008), and a new clip is selected therefrom.

On each occasion when the user selects a CD or album (step 2012), the set of sequences of sound clips from which the "now playing" clip is selected is changed to correspond to works from that CD or album (step 2008), and a new clip is selected therefrom.

Thus, in this embodiment, the user is presented with background music tailored to their current area of interest. Where a user has logged in, as described above in the first embodiment, then rather than beginning with a random selection, the sequence of sound clips may be selected from within a genre selected by the user in a previous session.

In this embodiment, these "now-playing" clips are no longer than 30 seconds long, and a set of clips from which the selection is made is stored locally at each terminal, thus allowing immediate access without the need for downloading.

In this embodiment, the mood/occasion data is used to allow selection of music either for an occasion or for a relative as described above, or via input of, for example, zodiac sign or other criteria.

Other Modifications and Embodiments

Other playable media, such as DVD or video cassettes, are dealt with similarly, clips being downloaded for reproduction via the network 20.

Likewise, for computer or video games, a pre-recorded playing sequence of the game is downloaded and played as video, rather than downloading the game itself.

It will be apparent that the principles behind the present invention could be extended to other types of work, such as books (in which case a portion of text from the book would be reproduced on the display screen). Furthermore, in addition to offering the purchase of playable media, the kiosk terminals of the present invention could additionally be used for other purchases, such as retrieving e-mail.

It will also be apparent that the kiosk terminals of the present invention could be fitted with a communication port to enable customers to download works to portable devices at the point of sale. For example, customers could download music onto MiniDiscs (TM) or solid state MP3 recorder/players.

Although the above-described embodiments relate to free standing kiosks connected by a broadband private network, aspects of the embodiments could also be applied to internet music purchase sites (similar to that at http://www.dotmusic.com for instance), or to broadband systems such as interactive cable TV or Asynchronous Digital Subscriber Line (ADSL) systems.

These and many other variants, modifications or substitutions can be made without departing from the scope of the invention and will be considered to be disclosed herein. For the avoidance of doubt, protection is hereby claimed for any novel subject matter disclosed herein or combinations thereof.

The invention claimed is:

1. A computer-implemented method for enabling a customer to sample items of playable content prior to potential purchase, comprising:
    receiving, via a network and from a terminal disposed in a retail site, input selection information indicative of an item to be sampled by a customer, the item including playable content;
    determining a base price associated with the item;
    accessing a pricing model for the item of playable content that depends on a current usage of the network;
    computing a price characteristic of the item of playable content based on the base price and the pricing model;
    transmitting the price characteristic over the network to the terminal for display to the customer; and
    transmitting a sample of the item over the network to the terminal,
    wherein determining a base price associated with the item further comprises interrogating a content database for a database record associated with the content, and
    wherein the database record further comprises an artist name field, a record label field, an album title field, a track title field, a release date field, a genre field, a catalog number field, a mood classification field, an average age field, a predominant sex field, a related item list field, the base price field, a delivery period field, an art clip field, a sound sample field, a written notes field, and a written reviews field.

2. The method of claim 1, wherein computing the price characteristic of the item further comprises:
    computing a first price if the usage of the network is at a first network load; and
    computing a second price if the usage of the network is at a second network load,
    wherein the first price is different from the second price.

3. The method of claim 2,
    wherein the first price is lower than the second price if the first network load is lower than the second network load, and
    wherein the first price is higher than the second price if the first network load is higher than the second network load.

4. The method of claim 3,
    wherein the first network load corresponds to an off-peak network load, and
    wherein the second network load corresponds to a peak network load.

5. The method of claim 1, wherein the terminal comprises a free-standing, self-service kiosk.

6. The method of claim 1, further comprising:
    determining a geographic location of the terminal; and
    interrogating a stock control computer associated with the retail site based on the item,
    transmitting an availability indicia to the terminal via the network if, based on interrogating the stock control computer, the item is available at the retail site.

7. The method of claim 1, wherein the item is an album, a video cassette, a T-shirt, a video game, or a digital versatile disc (DVD).

8. The method of claim 1, wherein transmitting the sample of the item over the network to the terminal further comprises downloading music content to an MPEG-1 Audio Layer 3 (MP3) player at the terminal.

9. The method of claim 1, further comprising automatically determining the current usage of the network, wherein the price characteristic of the item is computed further based on the automatically determined current usage of the network.

10. A device for enabling a customer to sample items of playable content prior to potential purchase, comprising:
an interface configured to:
receive, via a network and from a terminal disposed in a retail site, input selection information indicative of an item to be sampled by a customer, the item including playable content,
transmit a price characteristic over the network to the terminal for display to the customer, and
transmit a sample of the item over the network to the terminal; and
a processor configured to:
determine a base price associated with the item,
access a pricing model for the item of playable content that depends on a current usage of the network, and
compute the price characteristic of the item of playable content based on the base price and the pricing model,
wherein determining a base price associated with the item further comprises interrogating a content database for a database record associated with the content, and
wherein the database record further comprises an artist name field, a record label field, an album title field, a track title field, a release date field, a genre field, a catalog number field, a mood classification field, an average age field, a predominant sex field, a related item list field, the base price field, a delivery period field, an art clip field, a sound sample field, a written notes field, and a written reviews field.

11. A computer program product, tangibly embodied in a machine-readable medium, for enabling a customer to sample items of playable content prior to potential purchase, the computer program product comprising instructions that, when read by a machine, operated to cause a data processing apparatus to:
receive, via a network and from a terminal disposed in a retail site, input selection information indicative of an item to be sampled by a customer, the item including playable content;
determine a base price associated with the item;
access a pricing model for the item of playable content that depends on a current usage of the network;
compute a price characteristic of the item based on the base price and the pricing model;
transmit the price characteristic over the network to the terminal for display to the customer; and
transmit a sample of the item over the network to the terminal,
wherein determining a base price associated with the item further comprises interrogating a content database for a database record associated with the content, and
wherein the database record further comprises an artist name field, a record label field, an album title field, a track title field, a release date field, a genre field, a catalog number field, a mood classification field, an average age field, a predominant sex field, a related item list field, the base price field, a delivery period field, an art clip field, a sound sample field, a written notes field, and a written reviews field.

12. A computer-implemented method for enabling a customer to sample items of playable content prior to potential purchase, comprising:
receiving, via a network and from a free-standing, self-service kiosk disposed in a retail site, input selection information indicative of an item to be sampled by a customer, the item including playable music content;
determining a base price associated with the item by interrogating a content database for a database record associated with the playable music content, wherein the database record further comprises an artist name field, a record label field, an album title field, a track title field, a release date field, a genre field, a catalog number field, a mood classification field, an average age field, a predominant sex field, a related item list field, the base price field, a delivery period field, an art clip field, a sound sample field, a written notes field, and a written reviews field;
accessing a pricing model that depends on a usage of the network;
computing a price characteristic of the item based on the base price and the pricing model, further comprising;
computing a first price if the usage of the network is at an off-peak network load; and
computing a second price if the usage of the network is at a peak network load,
wherein the first price is lower than the second price of the off-peak network load is lower than the peak network load;
transmitting the price characteristic over the network to the kiosk for display to the customer; and
transmitting a sample of the item over the network to the kiosk by downloading the playable music content to an MPEG-1 Audio Layer 3 (MP3) player at the terminal.

13. The method of claim 1, wherein:
the network comprises a private telecommunications channel which is not the Internet; and
the current usage of the network comprises the current usage of the private telecommunications channel.

14. The method of claim 1, wherein the current usage comprises a usage of the network when the input selection information is received.

15. The method of claim 1, further comprising providing the base price and the price characteristic for simultaneous display to the customer.

16. The method of claim 1, wherein computing the price characteristic of the item of playable content further comprises applying a discount to the base price of the item of playable content during a period of off-peak demand.

17. The method of claim 1, wherein the price characteristic comprises a price of the item of playable content at a time of the current usage.

18. The method of claim 1, wherein the database record further comprises a release date field.

19. The method of claim 1, wherein the database record further comprises a genre field.

20. The method of claim 1, wherein the database record further comprises a mood classification field.

21. The method of claim 1, wherein the database record further comprises an average age field.

22. The method of claim 1, wherein the database record further comprises a predominant sex field.

23. The method of claim 1, wherein the database record further comprises a written reviews field.

24. The method of claim 1, further comprising:
presenting the price characteristic to the customer;
receiving an indication that the customer is satisfied with the price characteristic and wishes to purchase the item, after the price characteristic is presented to the customer.

* * * * *

UNITED STATES PATENT AND TRADEMARK OFFICE
CERTIFICATE OF CORRECTION

PATENT NO.        : 7,562,032 B2
APPLICATION NO. : 10/204569
DATED             : July 14, 2009
INVENTOR(S)       : Abbosh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1276 days.

Signed and Sealed this

Seventh Day of September, 2010

David J. Kappos
*Director of the United States Patent and Trademark Office*